(12) United States Patent
Takata et al.

(10) Patent No.: US 7,684,079 B2
(45) Date of Patent: Mar. 23, 2010

(54) IMAGE FORMING APPARATUS AND ITS CONTROL METHOD

(75) Inventors: Tsutomu Takata, Yokohama (JP);
Hiroki Kitamura, Kawasaki (JP);
Yoshiyuki Akiba, Yokohama (JP);
Shuichi Nakamura, Kawasaki (JP);
Yusuke Yamamoto, Tokyo (JP);
Masanao Motoyama, Tokyo (JP);
Takeshi Akiyama, Tokyo (JP); Kenzo Tojima, Tokyo (JP); Takaaki Nagaoka, Hadanoshi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1162 days.

(21) Appl. No.: 11/274,141

(22) Filed: Nov. 16, 2005

(65) Prior Publication Data
US 2006/0119895 A1  Jun. 8, 2006

(30) Foreign Application Priority Data
Dec. 2, 2004 (JP) ............................. 2004-350302
Dec. 2, 2004 (JP) ............................. 2004-350303
Dec. 2, 2004 (JP) ............................. 2004-350304

(51) Int. Cl.
*G06F 15/00* (2006.01)
*G06K 1/00* (2006.01)
*H04N 1/60* (2006.01)

(52) U.S. Cl. .................. 358/1.9; 358/2.1; 358/3.21; 358/3.23; 358/3.24; 358/3.26; 358/1.16; 358/444; 358/534; 358/521; 358/524

(58) Field of Classification Search ............. 358/1.9, 358/2.1, 3.21, 3.23–3.24, 3.26, 1.16, 444, 358/524, 521, 534–536, 518, 3.01–3.09, 358/1.7; 347/115, 118, 119, 131, 132, 232, 347/237, 240, 247, 251, 254
See application file for complete search history.

(56) References Cited

U.S. PATENT DOCUMENTS

| 5,392,070 | A  | * | 2/1995  | Endo et al. ............... 348/247 |
| 5,566,003 | A  | * | 10/1996 | Hara et al. ............... 358/448 |
| 6,097,501 | A  | * | 8/2000  | Hayashi et al. ........... 358/1.9 |
| 6,906,825 | B1 | * | 6/2005  | Nakahara et al. ......... 358/1.9 |
| 2002/0048056 | A1 | * | 4/2002 | Kubo ....................... 358/518 |

(Continued)

FOREIGN PATENT DOCUMENTS

JP        64-040956 A       2/1989

(Continued)

OTHER PUBLICATIONS

Office Action dated Oct. 23, 2009 in JP 2004-350303.
Office Action dated Oct. 23, 2009 in JP 2004-350304.

*Primary Examiner*—Benny Q Tieu
*Assistant Examiner*—Quyen Ngo
(74) *Attorney, Agent, or Firm*—Fitzpatrick, Cella, Harper & Scinto

(57) ABSTRACT

An image forming engine has color shifting amount storage units C, M, Y, and K (black) which store actual shifting amounts relative to ideal scan directions on image carriers C, M, Y, and K in image forming units C, M, Y, and K. Color shifting correction amount arithmetic units calculate color shifting correction amounts for respective color components to base on the stored color shifting amounts. Color shifting correction units C, M, Y, and K perform color shifting correction by converting coordinates upon reading out image data from bitmap memories C, M, Y, and K on the basis of the calculated color shifting correction amounts, and then perform tone correction. Data after tone correction undergo halftone processing by halftone processors. C, M, Y, and K to suppress moire. PWM processors C, M, Y, and K generate PWM signals for scanning, and output them to exposure units C, M, Y, and K of the respective image forming units.

21 Claims, 26 Drawing Sheets

U.S. PATENT DOCUMENTS

| | | | |
|---|---|---|---|
| 2002/0067511 A1* | 6/2002 | Fujita | 358/3.06 |
| 2004/0022556 A1 | 2/2004 | Nomura | 399/116 |
| 2006/0226338 A1 | 10/2006 | Tojima et al. | 250/208.1 |
| 2006/0232620 A1 | 10/2006 | Kitamura et al. | 347/15 |

FOREIGN PATENT DOCUMENTS

| | | |
|---|---|---|
| JP | 08-085237 A | 4/1996 |
| JP | 2000-253232 | 9/2000 |
| JP | 2003-255652 | 9/2003 |
| JP | 2003/280313 | 10/2003 |
| JP | 2003-337456 | 11/2003 |
| JP | 2004-074509 | 2/2004 |
| JP | 2004-106212 | 4/2004 |
| JP | 2004-184469 | 7/2004 |
| JP | 2004-226553 | 8/2004 |
| RU | 2175145 C2 | 10/2001 |
| WO | 96-39301 A | 12/1996 |

* cited by examiner

FIG. 5

| REGION | WIDTH(mm) | SHIFTING AMOUNT(mm) |
|---|---|---|
| REGION 1 | L1 | m1 |
| REGION 2 | L2 | m2 |
| REGION 3 | L3 | m3 |

FIG. 7A
SLOPE SHIFTING AMOUNT
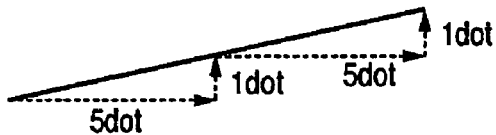
FIG. 7B
BITMAP IMAGE
(BEFORE TONE CORRECTION)
FIG. 7C
CORRECTION
BITMAP IMAGE
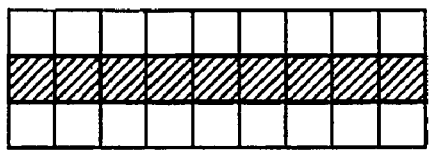
FIG. 7D
CORRECTION AMOUNT
| Δy | 0 | 0.25 | 0.5 | 0.75 | 1 | 1.25 | 1.5 | 1.75 | 2 |
|---|---|---|---|---|---|---|---|---|---|
| k | 0 | 0 | 0 | 0 | 1 | 1 | 1 | 1 | 2 |
| β = Δy − k | 0 | 0.25 | 0.5 | 0.75 | 0 | 0.25 | 0.5 | 0.75 | 0 |
| α = 1 − β | 0 | 0.75 | 0.5 | 0.25 | 0 | 0.75 | 0.5 | 0.25 | 0 |
FIG. 7E
BITMAP IMAGE
(AFTER TONE CORRECTION)
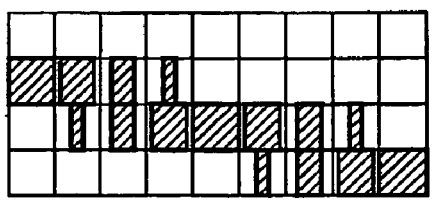
FIG. 7F
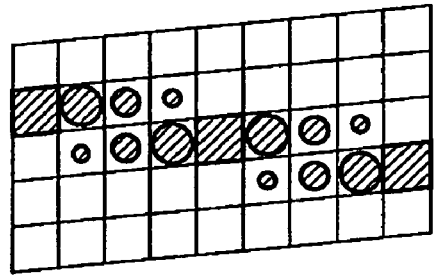
EXPOSURE IMAGE

FIG. 18A  IN CASE OF 1-DOT SCAN
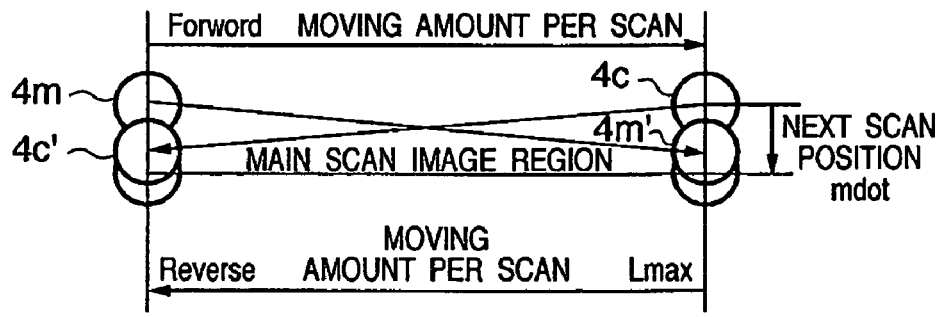
FIG. 18B  IN CASE OF 2-DOT SCAN
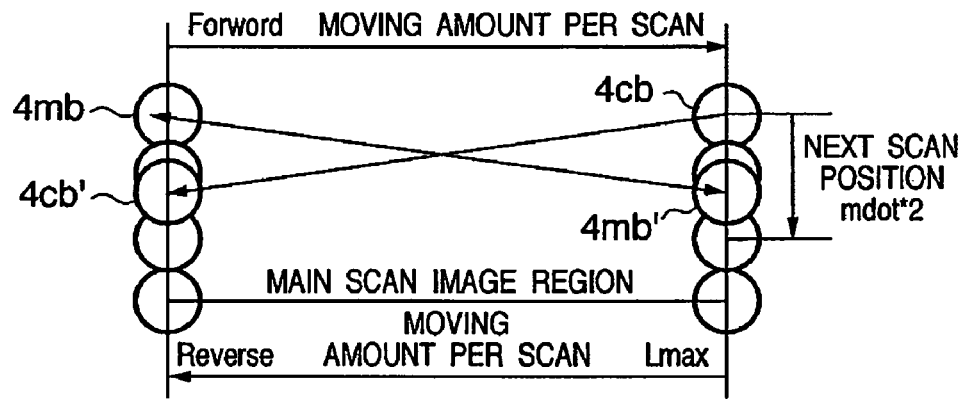
FIG. 18C  IN CASE OF 3-DOT SCAN
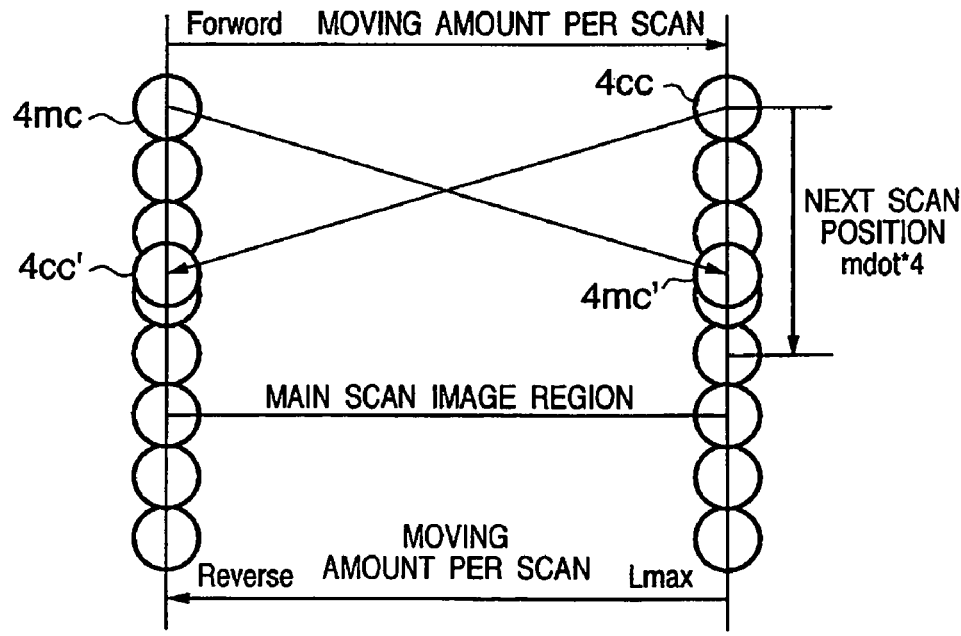

IMAGE FORMING APPARATUS AND ITS CONTROL METHOD

FIELD OF THE INVENTION

The present invention relates to a technique for forming a color image by transferring color formers that form color component images to be developed on a plurality of juxtaposed image carriers onto a conveyed print medium.

BACKGROUND OF THE INVENTION

Conventionally, as a color image forming apparatus which uses an electrophotography method, an apparatus which uses a plurality of developers for one photosensitive body to develop respective color components is known. This apparatus repeats an "exposure—development—transfer" process a number of times equal to the number of color components to overlay and form color images on a single transfer sheet in these processes, and to fix these color images, thus obtaining a full-color image.

With this method, the image forming process must be repeated three times, or four times if black is used, per print image, and thus takes a long time to complete image formation.

As a method that can cover this shortcoming, a technique that uses a plurality of photosensitive bodies, overlays visible images obtained for respective colors in turn on a transfer sheet, and obtains a full-color print by a single sheet feed process is known.

With this method, the throughput can be greatly improved. However, color shifting owing to position shifts of respective colors on the transfer sheet occurs due to limitations on the achievable positional precision of, and diameter shifts (slight shifts in position of the axes) of the respective photosensitive bodies, positional precision shifts of the respective optical systems, and the like, and it becomes difficult to obtain a high-quality full-color image.

As a method of preventing this color shifting, a technique for forming a test toner image on a transfer sheet or a conveyor belt that forms a part of transfer means, detecting that image, and correcting the optical paths of respective optical systems and correcting the image write start positions of respective colors based on the detection result is known (e.g., Japanese Patent Laid-Open No. 64-40956; to be referred to as "reference 1" hereinafter).

Also, a technique for automatically converting the output coordinate positions of image data for respective colors into those from which any registration shifting is corrected, and correcting the positions of modulated light beams in an amount smaller than a minimum dot unit of each color signal by correction means on the basis of the converted image data of the respective colors is known (e.g., Japanese Patent Laid-Open No. 8-85237; to be referred to as "reference 2" hereinafter).

However, with the technique of reference 1, the following problems remain unsolved.

First, in order to correct the optical paths of the optical systems, a correction optical system including a light source and f-θ lens, mirrors in the optical paths, and the like must be mechanically operated to adjust the position of the test toner image. That is, high-precision movable members are required, resulting in high cost. Furthermore, since it takes a long time to complete the correction, the correction cannot be frequently made. Also, the optical path lengths often change with the lapse of time due to the temperature rise of the machine. In such case, it is difficult to prevent color shifting by correcting the optical paths of the optical systems.

Second, upon correcting the write-start positions of images, the position shifts of the upper end and upper left portion can be corrected. However, any tilt of an optical system, and any magnification shifting that may occur due to possible optical path length shifting, cannot be corrected.

In reference 2, as a result of correcting the output coordinate positions of image data for respective colors for an image that has undergone halftone processing, dot reproducibility of the halftone image deteriorates, color nonuniformity occurs and moire becomes obvious.

FIG. 1 shows an example, which will be described below. An input image 101 has an image having a given density value. Assume that an image 102 obtained by applying arbitrary color shifting correction to this input image 101 is printed in practice. In this case, since the image density values and toner densities for that image density value have a nonlinear relationship, although the input image 101 has a constant density value, if the image after color shifting correction is printed, the result is an actual printed image whose density value is not constant. Therefore, when such nonuniform density values appear periodically, moire becomes obvious, and a high-quality color image cannot be obtained.

Furthermore, in the search for ways to speed up printer engines, it has become common not to stop the photosensitive drum during scanning exposure of a laser beam, but rather to rotate it even during scanning exposure. At this time, if the scanning exposure directions of image forming units of respective color components are the same, no problem is posed. However, when a given image forming unit scans in a direction opposite to that of another image forming unit, this causes color nonuniformity. Since the scan speed and rotational speed of the drum vary depending on print mode, color shifting cannot be suppressed by means of a single countermeasure processing so far.

SUMMARY OF THE INVENTION

The present invention has been made to solve the aforementioned problems, and has as its object to provide a technique for forming a high-quality image by correcting any color shifting first by calculating the read coordinate position of image data to be printed on the basis of shifting-amount information indicating a shifting amount with respect to the scanning direction on an image carrier of each image forming unit, and then executing halftone processing to print an image, thus suppressing generation of moire due to color-shifting correction.

In order to achieve the above object, for example, an image forming apparatus of the present invention comprises the following arrangement. That is, there is provided an image forming apparatus in which image forming units each having an image carrier, an exposure unit for scanning exposure on the image carrier, and a developing unit for visualizing an electrostatic latent image generated by exposure using a color former are juxtaposed in a conveying direction of a print medium, characterized by comprising:

image data storage means for storing image data to be formed by each image forming unit;

exposure shifting amount storage means for storing shifting amount information indicating a shifting amount with respect to a scanning direction on the image carrier of each image forming unit;

coordinate conversion means for converting coordinates of a read address of the image data storage means on the basis of the exposure shifting amount information stored in the exposure shifting amount storage means, and reading out image data according to the converted address information;

correction means for correcting a tone of pixel data read out by the coordinate conversion means on the basis of the converted address information;

halftone means for applying predetermined halftone processing to the pixel data obtained by the correction means; and output means for outputting the pixel data obtained by the halftone means as an exposure control signal of the exposure unit of the corresponding image forming unit.

It is an object of the second invention to provide a technique for forming a high-quality image by suppressing generation of jaggedness even in an edge of a character/line image, in addition to the object of the first invention.

In order to achieve the above object, an image forming apparatus according to the second invention comprises the following arrangement. That is, there is provided an image forming apparatus in which image forming units each having an image carrier, an exposure unit for scanning exposure on the image carrier, and a developing unit for visualizing an electrostatic latent image generated by exposure using a color former are juxtaposed in a conveying direction of a print medium, characterized by comprising:

image data storage means for storing image data to be formed by each image forming unit;

exposure shifting amount storage means for storing shifting amount information indicating a shifting amount with respect to a scanning direction on the image carrier of each image forming unit;

coordinate conversion means for converting coordinates of a read address of the image data storage means on the basis of the exposure shifting amount information stored in the exposure shifting amount storage means, and reading out image data according to the converted address information;

buffer means for storing pixel data read out by the coordinate conversion means for a plurality of lines;

determination means for determining, based on pixel data of interest and a surrounding pixel data group stored in the buffer means, if the pixel data of interest belongs to an image edge;

first processing means for, when the determination means determines that the pixel of interest belongs to a non-image edge, applying halftone processing for the non-image edge to the pixel data of interest;

correction means for, when the determination means determines that the pixel of interest belongs to the image edge, correcting a tone of the pixel data of interest stored in the buffer means on the basis of address information used upon conversion by the coordinate conversion means;

second processing means for applying processing for an edge different from the first processing means to the pixel data obtained by the correction means; and output means for outputting the pixel data obtained by the first and second processing means as an exposure control signal of the exposure unit of the corresponding image forming unit on the basis of the determination result of the determination means.

It is an object of the third invention to provide a technique for forming a high-quality image by executing color shifting correction first by calculating the read coordinate position of image data to be printed using not only an exposure profile indicating a shifting amount with respect to the scanning direction on an image carrier of each image forming unit, but also a print profile as configuration information of a print engine, and then executing halftone processing to print an image, thereby suppressing generation of moire due to the color shifting correction and also generation of jaggedness even in an edge of a character/line image.

In order to achieve the above object, an image forming apparatus according to the third invention comprises the following arrangement. That is, there is provided an image forming apparatus in which image forming units each having an image carrier, an exposure unit for scanning exposure on the image carrier, and a developing unit for visualizing an electrostatic latent image generated by exposure using a color former are juxtaposed in a conveying direction of a print medium, characterized by comprising:

image data storage means for storing image data to be formed by each image forming unit;

exposure shifting amount storage means for storing shifting amount information indicating a shifting amount with respect to a scanning direction on the image carrier of each image forming unit;

configuration information storage means for storing information associated with a configuration of each image forming unit;

coordinate conversion means for converting coordinates of a read address of the image data storage means on the basis of the exposure shifting amount information stored in the exposure shifting amount storage means and the configuration information stored in the configuration information storage means, and reading out image data according to the converted address information;

determination means for determining, based on pixel data of interest and a surrounding pixel data group obtained by the coordinate conversion means, if the pixel data of interest belongs to an image edge;

first processing means for, when the determination means determines that the pixel of interest belongs to a non-image edge, applying predetermined halftone processing;

correction means for, when the determination means determines that the pixel of interest belongs to the image edge, correcting a tone of the pixel data of interest on the basis of the converted address information;

second processing means for applying processing for an edge different from the first processing means to the pixel data of interest after correction by the correction means; and output means for outputting one of the pixel data obtained by the first and second processing means as an exposure control signal of the exposure unit of the corresponding image forming unit on the basis of the determination result of the determination means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a table showing an example of information stored in a color shifting amount storage unit;

FIGS. 7A to 7F are views showing the operation for performing color shifting correction less than a pixel unit by a tone correction unit in the embodiment of FIG. 2;

FIGS. 18A to 18C are views for explaining the relationship between the number of beams and exposure tilt;

DETAILED DESCRIPTION OF THE PREFERRED EMBODIMENTS

The preferred embodiments of the present invention will now be described in detail in accordance with the accompanying drawings.

First Embodiment

Figure 1:
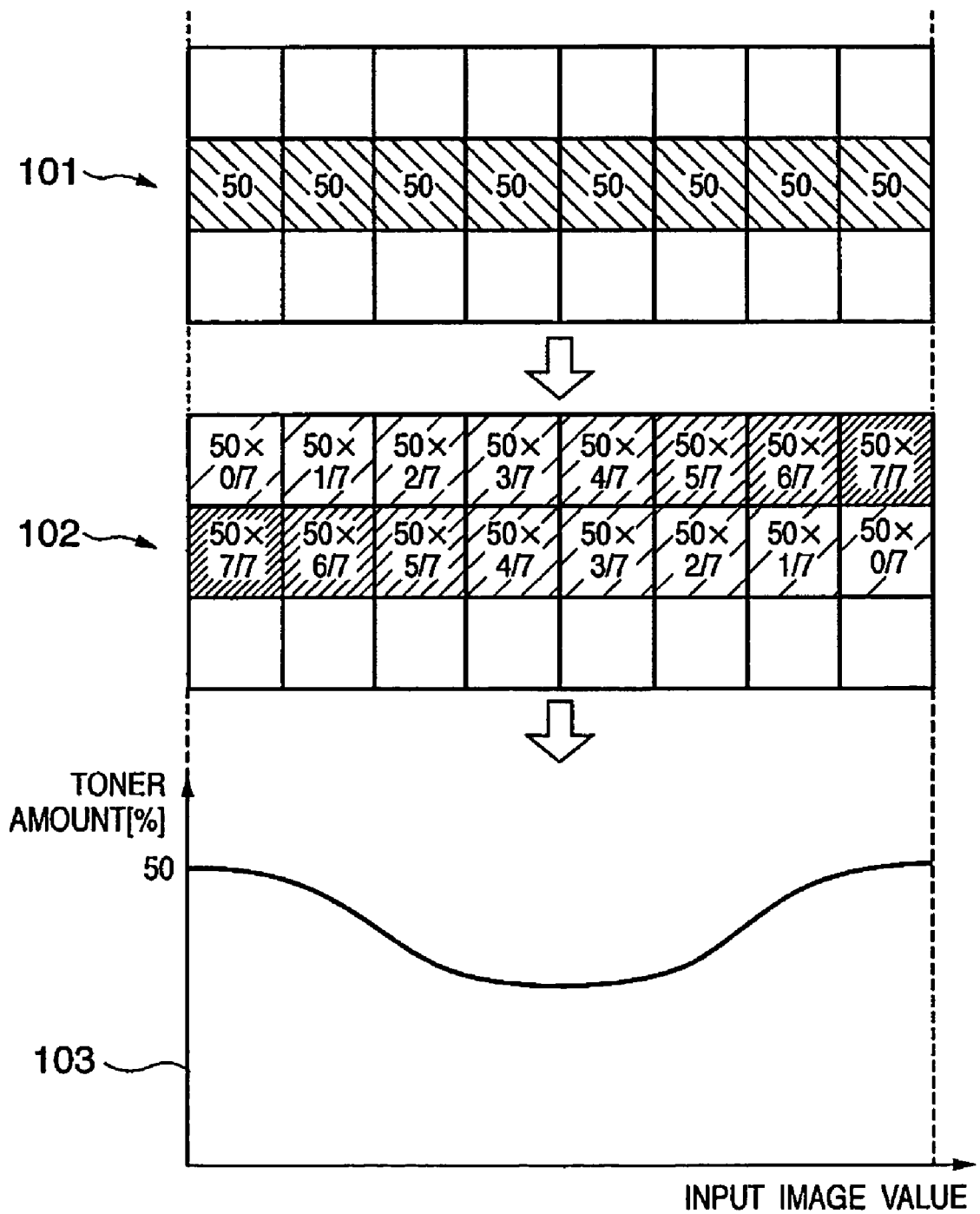
FIG. 1 is a view showing density nonuniformity in the prior art.
Figure 2:
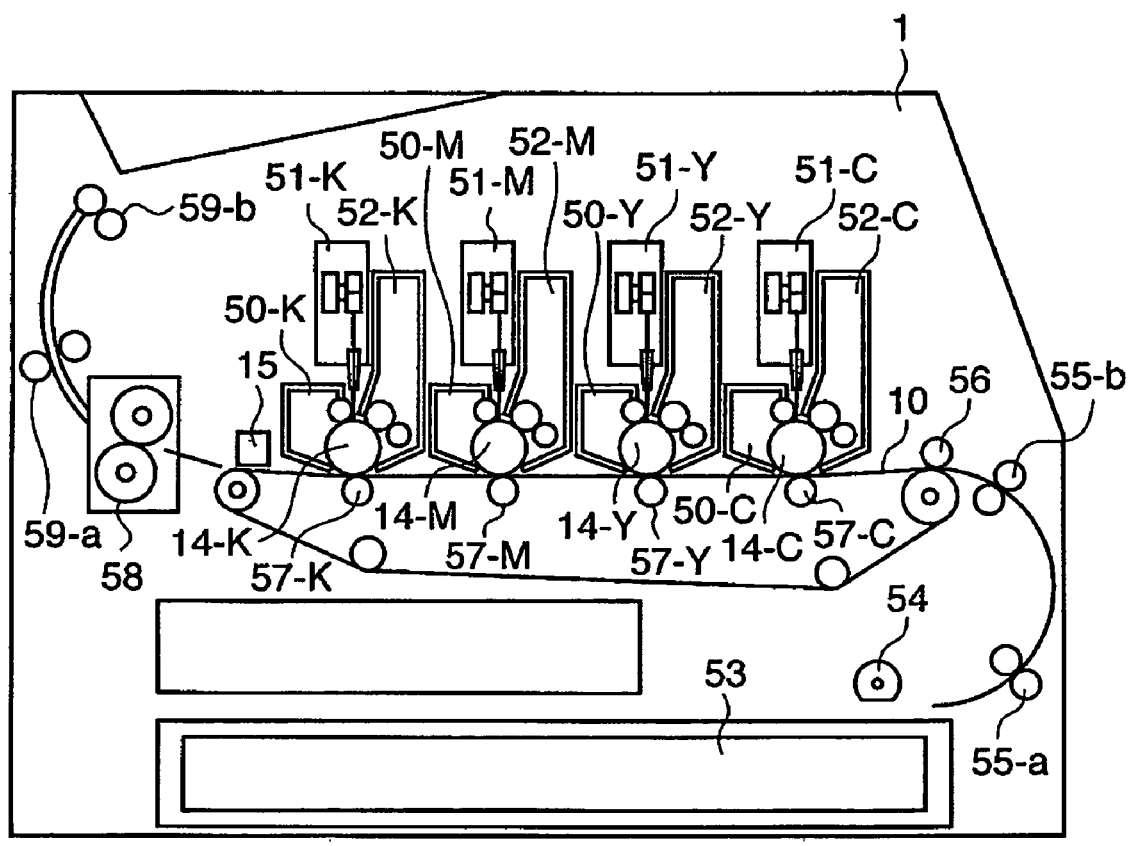
FIG. 2 is a sectional view showing the structure of an image forming apparatus according to an embodiment of the present invention.

FIG. 2 is a sectional view showing the structure of an image forming apparatus according to this embodiment.

As shown in FIG. 2, the image forming apparatus of this embodiment has the structure of a 4-drum color laser beam printer.

This image forming apparatus mounts a transfer sheet cassette 53 in a lower portion on the right side of FIG. 2. Print media (print sheets, transparent sheets, or the like) set in the transfer sheet cassette 53 are picked up one by one by a paper feed roller 54 and are fed to image forming units by a pair of conveying rollers 55-*a* and 55-*b*. The image forming units are provided with a transfer conveyor belt 10 for conveying a print medium. The transfer conveyor belt 10 is tightened flat by a plurality of rollers in the print medium conveying direction (from the right to left in FIG. 2), and a print medium is electrostatically attracted onto the conveyor belt 10 at its most upstream portion. Four photosensitive drums 14-C, 14-Y, 14-M, and 14-K, which serve as drum-shaped image carriers, are linearly arranged to face the conveyor belt surface, thus forming the image forming units (note that C, Y, M, and K respectively indicate cyan, yellow, magenta, and black color components).

Since the image forming units for respective color components have the same structure except for the colors of toners to be stored, the image forming unit for the color component C will be described below as an example.

The C image forming unit has a charger 50-C for uniformly charging the surface of the photosensitive drum 14-C, a developing unit 52-C for storing C toner, and visualizing (developing) an electrostatic latent image generated on the photosensitive drum 14-C, and an exposure unit 51-C. A predetermined gap is formed between the developing unit 52-C and charger 50-C. The surface of the photosensitive drum 14-C which is uniformly charged by the charger 50-C is scanned by a laser beam from the exposure unit 51-C including a laser scanner via the gap in a direction perpendicular to the plane of the drawing. As a result, the scanned exposure portion has a charged state different from an unexposed portion, thus forming an electrostatic latent image. The developing unit 52-C visualizes the electrostatic latent image by transferring toner to it ("toner image formation", or "development").

A transfer unit 57-C is arranged over the conveying surface of the transfer conveyor belt 10. The toner image formed (developed) on the circumferential surface of the photosensitive drum 14-C is electrically attracted on the conveyed print medium by a transfer electric field formed by the transfer unit 57, and is transferred onto the print medium surface.

The aforementioned processing is similarly repeated for other color components Y, M, and K, so that C, M, Y, and K toners are transferred in turn onto the print medium. After that, a fixing device 58 fixes the color toners on the print medium by thermally melting them, and the print medium is ejected from the apparatus via a pair of exhaust rollers 59-*a* and 59-*b*.

Note that the toner images of respective color components are transferred onto the print medium in the above example. However, toner images of the respective color components may be transferred onto the transfer conveyor belt, and they may be transferred again onto a print medium (secondary transfer). The transfer belt in this case is called an intermediate transfer belt.

Figure 3:
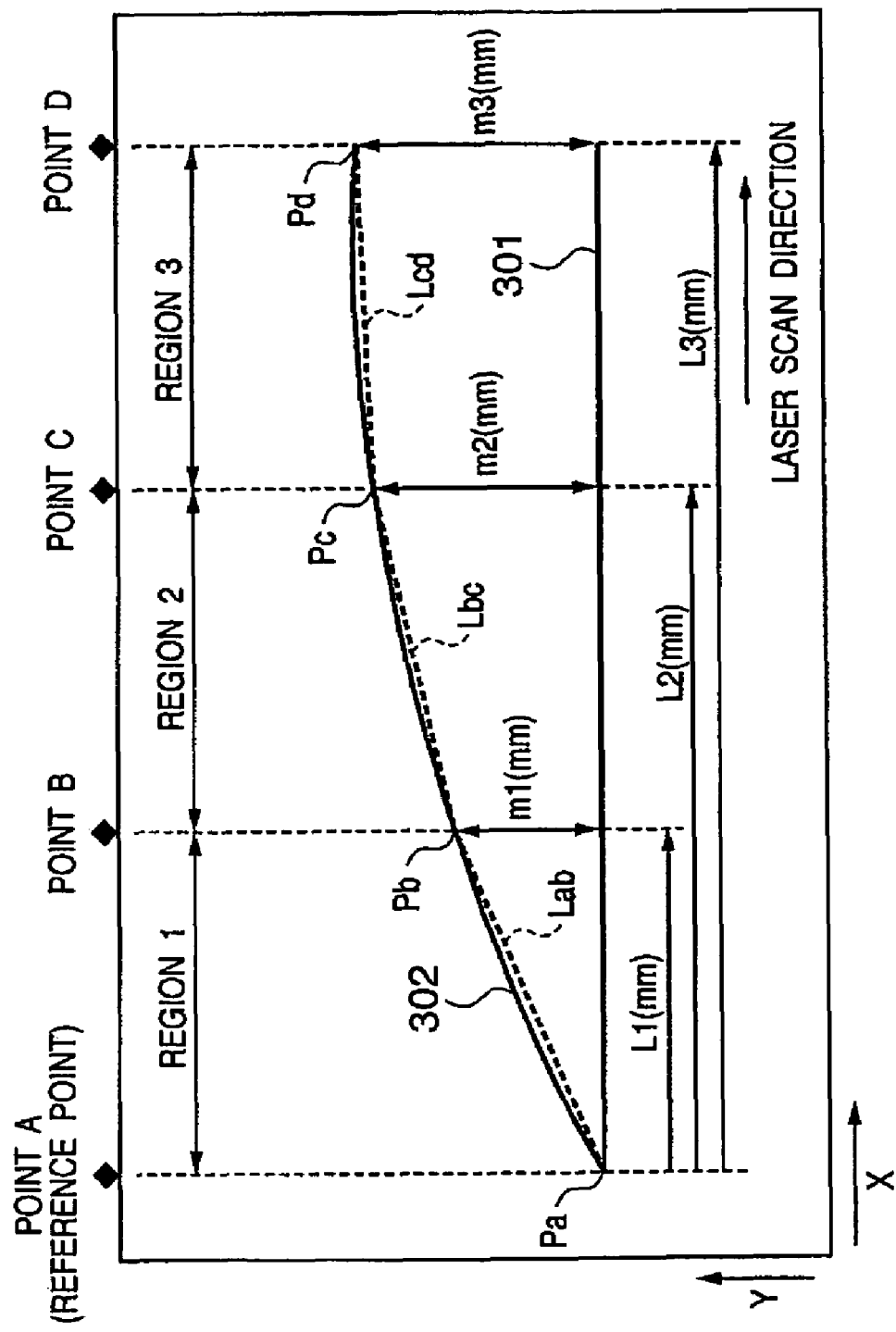
FIG. 3 is a graph for explaining shifting of a main scan line scanned on a photosensitive drum in the embodiment of FIG. 2.

FIG. 3 shows an image to explain shifting of a main scan line scanned on the photosensitive drum 14-C (or may be M, Y, and K) as an image carrier. The horizontal direction (x-axis direction) in FIG. 3 indicates the scanning direction of a laser beam, and the vertical direction (y-axis direction) indicates the rotation direction of the photosensitive drum (which agrees with the convey direction of a print medium).

In FIG. 3, reference numeral 301 denotes an ideal main scan line. Reference numeral 302 denotes an example of an actual main scan line which suffers an upward slope and curvature resulting from the positional precision and diameter shifts of the photosensitive drum 14 and the positional precision shifting of the optical system in the exposure unit 51 of each color.

When such slope and curvature of the main scan line exist in the image forming unit of any color, a color shifting occurs when a plurality of toner images are simultaneously transferred onto a transfer medium.

In this embodiment, point A, serving as a scan start position of the print region, is set as a reference point in the main scan direction (X-direction), and shifting amounts between the ideal main scan line 301 and actual main scan line 302 in the sub-scan direction are measured at a plurality of points (points B, C, and D). The main scan line is divided into a plurality of regions (to define region 1 between Pa and Pb, region 2 between Pb and Pc, and region 3 between Pc and Pd) at respective points where the shifting amounts are measured, and the slopes of the main scan line in respective regions are approximated by straight lines (Lab, Lbc, and Lcd) which connect neighboring points. Therefore, when the difference (m1 in region 1, m2−m1 in region 2, and m3−m2 in region 3) between the shifting amounts of neighboring points is a positive value, it indicates that the main scan line in the region of interest has an upward slope; otherwise, it indicates that it has a downward slope. In this embodiment, the number of regions is three for the sake of convenience, and the present invention is not limited to such specific value.

Figure 4:
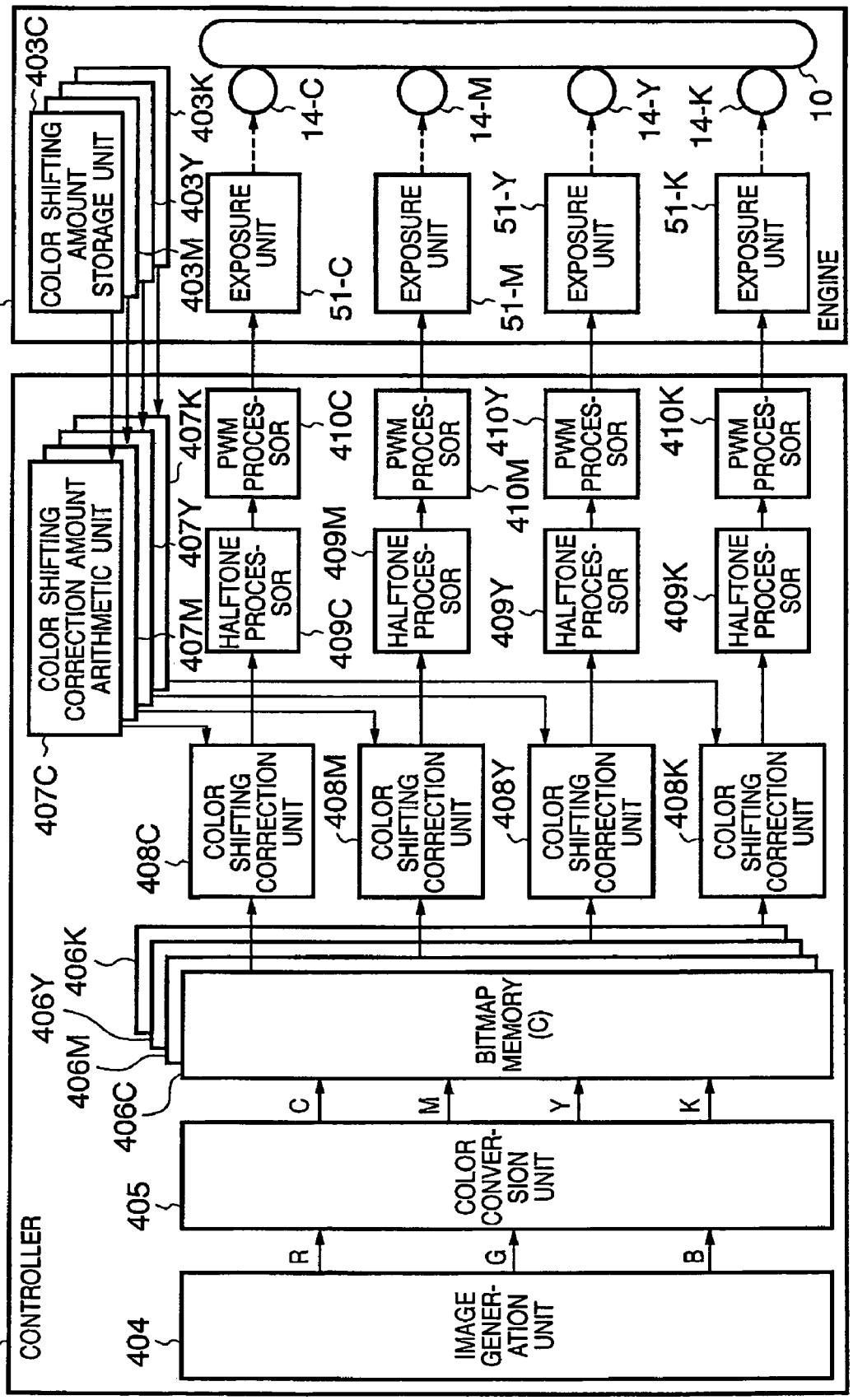
FIG. 4 is a block diagram showing the arrangement of a controller and engine in the image forming apparatus of the embodiment of FIG. 2.

FIG. 4 is a block diagram for explaining the operation of the color shifting correction processing for correcting a color shifting generated by the slope and curvature of the scan line in this embodiment.

Referring to FIG. 4, reference numeral 401 denotes a printer engine which performs actual print processing on the basis of image bitmap information generated by a controller 402. The controller 402 is accommodated in a board, and is electrically connected to the printer engine 401 when the board is accommodated in the apparatus.

Reference numerals 403C, 403M, 403Y, and 403K denote color shifting amount storage units, which receive and hold the shifting amount information for respective image forming units of respective colors in the process of the manufacture of the apparatus. For example, each color shifting amount storage unit can be implemented by a writable, nonvolatile memory such as an EEPROM or the like. In FIG. 4, the color shifting amount storage units are assured for respective color components. However, since the information size to be stored is sufficiently small, one memory element may store the color shifting amounts for all the color components.

The color shifting amount storage units 403C, 403M, 403Y, and 403K of this embodiment store shifting amounts between the actual main scan line 302 and ideal main scan line 301 in the sub-scan direction, which are measured at a plurality of points, as described using FIG. 3, as information indicating the slope and curvature of the main scan line.

FIG. 5 shows an example of information stored in the color shifting amount storage unit 403C (the same applies to the units 403M, 403Y, and 403K, but information to be stored varies depending on the individual difference). In FIG. 5, L1 to L3 and m1 to m3 have the same meanings as those of the same symbols in FIG. 3.

In this embodiment, the color shifting amount storage units 403C, 403M, 403Y, and 403K store the shifting amounts between the ideal main scan line and actual main scan line. However, the present invention is not limited to such specific amounts as long as information can identify the slope and curvature characteristics of the actual main scan line. As described above, the information stored in each of the color shifting amount storage units 403C, 403M, 403Y, and 403K is stored in advance as information unique to the apparatus by measuring the shifting amount in the manufacturing process. Alternatively, a detection mechanism for detecting the shifting amounts may be prepared in the apparatus itself, and shifting amounts which are obtained by forming predetermined patterns used to measure shifts for respective image carriers of respective colors, and detecting them by the detection mechanism may be stored.

The controller 402 executes print processing by correcting image data for respective color components to cancel the shifting amounts of the main scan line stored in the color shifting amount storage units 403C, 403M, 403Y, and 403K. The controller 402 of this embodiment will be described below.

An image generation unit 404 generates raster image data that allows print processing on the basis of print data (PDL data, image data, or the like) received from an external apparatus (e.g., a computer apparatus; not shown), and outputs RGB data (8 bits/color, 256 tones) for respective pixels. Since this processing is known to those who are skilled in the art, a detailed description thereof will be omitted.

A color conversion unit 405 converts this RGB data into data (8 bits/color) on a CMYK space that can be processed by the printer engine 402 (this conversion is implemented by LOG conversion and UCR processing), and stores the converted data in subsequent bitmap memories 406C, 406M, 406Y, and 406K for respective print color components. The bitmap memory 406C (the same applies to the memories 406M, 406Y, and 406K) temporarily stores raster image data to be printed, and comprises a page memory for storing image data for one page. Alternatively, a band memory that stores data for several lines may be used. In the following description, assume that each memory has a capacity for storing C, M, Y, or K bitmap data for one page for the sake of simplicity.

Color shifting correction amount arithmetic units 407C, 407M, 407Y, and 407K calculate color shifting correction amounts in the sub-scan direction on the basis of the information of the color shifting amounts of the main scan line stored in the color shifting amount storage units 403C, 403M, 403Y, and 403K in accordance with the coordinate information in the main scan direction. The color shifting correction amount operation units 407C, 407M, 407Y, and 407K respectively output their calculation results to color shifting correction units 408C, 408M, 408Y, and 408K, which set the corresponding correction amounts.

Let x (dots) be coordinate data in the main scan direction, and y (dots) be the color shifting amount in the sub-scan direction. In this case, arithmetic formulas of the respective regions based on FIG. 3 are described by (assume that the print resolution in this embodiment is 600 dpi):

Region 1: $y = x*(m1/L1)$

Region 2: $y = m1*23.622 + (x - L1*23.622)*((m2-m1)/(L2-L1))$

Region 3: $y = m2*23.622 + (x - L1*23.622)*((m3-m2)/(L3-L2))$   (1)

where L1, L2, and L3 are the distances (unit: mm) from the scan start position of the print region to the right ends of regions 1, 2, and 3. Also, m1, m2, and m3 are the shifting amounts between the ideal main scan line 301 and actual main scan line 302 at the right ends of regions 1, 2, and 3.

The color shifting correction units 408C, 408M, 408Y, and 408K adjust the output timings of the bitmap data stored in the bitmap memories 406C, 406M, 406Y, and 406K and exposure amounts for respective pixels on the basis of the color shifting correction amounts calculated for respective dots by the color shifting amount arithmetic units 407C, 407M, 407Y, and 407K, so as to correct color shifts due to the slopes and distortions of the main scan line given by formulas (1), thereby color shifts (registration shifts) upon transferring the toner images of respective colors onto a transfer medium.

The color shifting correction units 408C, 408M, 408Y, and 408K respectively have different correction amounts but the same arrangements. Hence, the color shifting correction unit 408C for the C component will be described below.

Figure 8:
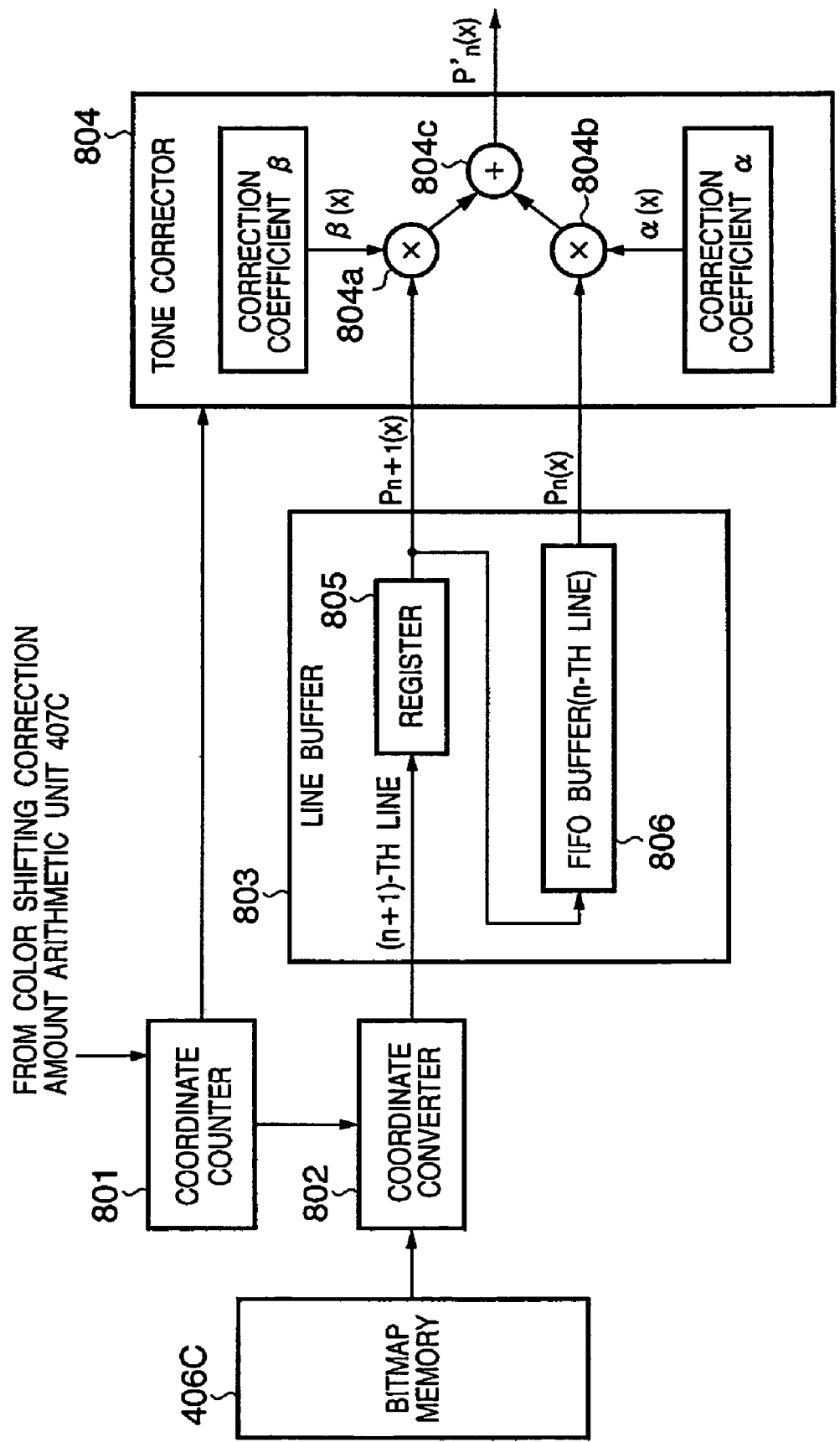
FIG. 8 is a block diagram showing the arrangement of a color shifting correction unit in the embodiment of FIG. 2.

FIG. 8 is a block diagram showing the arrangement of the color shifting correction unit 408C of this embodiment.

As shown in FIG. 8, the color shifting correction unit 408C of this embodiment comprises a coordinate counter 801, coordinate converter 802, line buffer 803, and tone corrector 804.

The coordinate counter 801 outputs information required to generate coordinates in the main scan and sub-scan directions, where the color shifting correction processing is to be executed, on the basis of formulas (1) to the coordinate converter 802, and outputs information indicating the degree of shifting in the sub-scan direction (a value after the decimal point, as will be described later) to the tone corrector 804.

The coordinate converter 802 makes read access to the bitmap memory 406C using coordinate position data (X-address) in the main scan direction and coordinate position data (Y-address) in the sub-scan direction from the coordinate counter 801. As a result, read-out data (C component data in this case) is output to the line buffer 803.

The line buffer 803 comprises a register 805 and a FIFO buffer 806 having a storage area for one line, as shown in FIG. 8, and outputs C component data of two neighboring pixels in the sub-scan direction to the tone corrector 804, which applies tone correction to these data.

Figure 11:
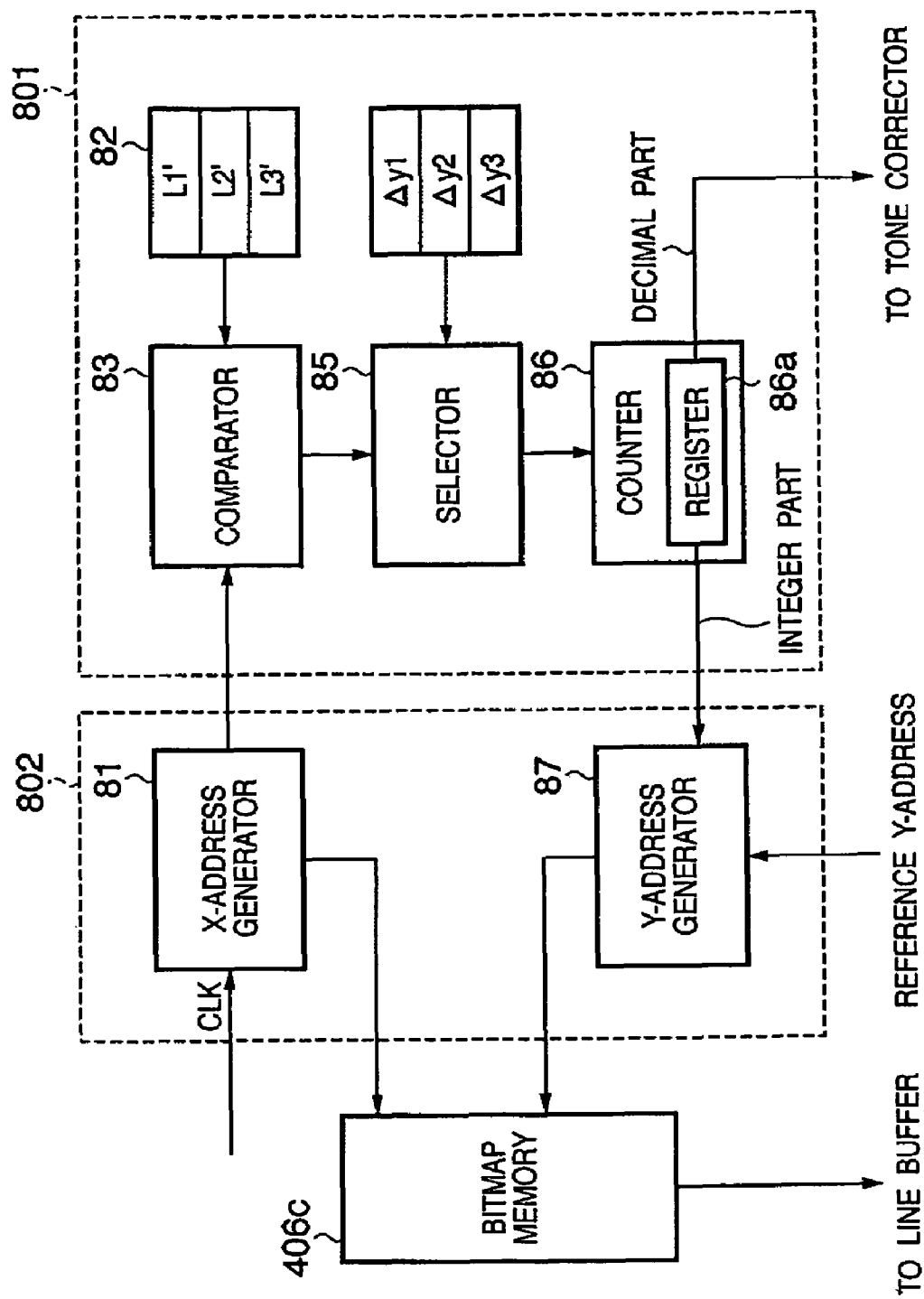
FIG. 11 is a block diagram showing the detailed arrangement of a coordinate counter 801 and coordinate conversion unit 802 in FIG. 8.

FIG. 11 shows a practical example of the coordinate counter 801 and coordinate converter 802 of this embodiment.

As a precondition, the color shifting correction amount arithmetic unit 407C calculates, based on the distances L1, L2, and L3 (unit: mm) stored in the color shifting correction amount storage unit 403C, pixel positions L1', L2', and L3' in the horizontal direction (ideal scan direction) corresponding to L1, L2, and L3. Also, the color shifting correction amount arithmetic unit 407C calculates the slopes of the straight lines that connect the shifting amounts of respective regions. Note that the slope is the one for each pixel, and is expressed by Δy.

In case of the example of FIG. 5, we have:

Region 1: $\Delta y1 = m1/L1$

Region 2: $\Delta y2 = (m2-m1)/(L2-L1)$

Region 3: $\Delta y3 = (m3-m2)/(L3-L2)$

A register 82 in FIG. 11 stores the pixel positions L1', L2', and L3'', and a register 84 stores Δy1, Δy2, and Δy3 (with a positive/negative sign) of the respective regions.

An X-address generator 81 is reset upon generating correction data for one scan of a laser beam, and generates a read address in the horizontal direction, i.e., X-address, for the bitmap memory 406C by adding pixel clocks clk. As a result, the X-address increments like 0, 1, 2, . . . every time the pixel clock clk is input.

A comparator 83 compares the X-address value from the X-address generator 81 with registers L1', L2', and L3' to see within which of regions 1, 2, and 3 in FIG. 3 the current X-address falls, and outputs the result. Since three states can be taken, an output signal suffices to be 2 bits.

A selector 85 selects and outputs one of the slopes Δy1, Δy2, and Δy3 stored in the register 84. That is, when the current X-address falls within the range of region 1 (X≦X L1'), Δy1 is selected and output. When L1'<X≦L2', Δy2 is selected and output; when L2'<X, Δy1 is selected and output.

A counter 86 is reset prior to one scan, cumulatively adds the slope Δy output from the selector 85 in an internal register 86a, and holds that value. Since the slope Δy includes a decimal part, this register 86a has an appropriate number of bits. The counter 86 outputs the integer part of the register 86, which is held by itself to a Y-address generator 87, and the decimal part to the tone corrector 804.

The Y-address generator 87 is set with a reference Y-address in the bitmap memory 406C prior to one scan, adds the reference Y-address and the integer part from the counter 86, and generates the result as a read Y address for the bitmap memory 406C.

As a result, X- and Y-addresses of integers in formulas (1) can be generated, and C component data at the corresponding position can be read out to the line buffer 803.

A more practical example will be described below. Assume that the reference Y-address is "100". That is, it is a case wherein data is generated for the 100th scan. Also, assume that the value stored in the register 86a in the counter 86 is "0.1".

At this time, pixel data which is located at the Y-coordinate position "100.1" in the bitmap memory 406C is to be ideally loaded. However, since the pixel position of the bitmap memory 406C is expressed by an integer, the Y-coordinate "100.1" does not exist. From another point of view, the coordinate "100.1" can be considered as being located between addresses "100" and "101", so that 90% of its pixel value to be calculated (that after tone correction) is influenced by the pixel value of the address "100", and the remaining 10% is influenced by that of the address "101". That is, a value after tone correction can be calculated using a weighting coefficient depending on a value indicated by the decimal part. That is, such value can be given by:

$$H_{x,y} = C_{x,y} * \beta + C_{x,y+1} * \alpha \quad (2)$$

Let γ be the decimal part value output from the counter 86. Then, α and β have relations given by:

$\beta = 1 - \gamma$ $\alpha = \gamma$

The tone corrector 804 in FIG. 8 executes the aforementioned processing. The tone corrector 804 receives the decimal part value y output from the counter 86, calculates correction coefficients α and β to be multiplied by multipliers 804a and 804b, and make these multipliers 804a and 804b multiply α and β, and γ, respectively. By adding these products by an adder 804c, formula (2) above is calculated, thus outputting the tone-corrected data.

Note that the reference Y-address is incremented by "1" for every scan, but the color shifting correction amount for that reference Y-address, i.e., an offset amount remains the same.

Let P and Q be the X- and Y-addresses generated by the coordinate converter 802, and the offset of that Y-address be 0.1. Then, the register 805 loads data at coordinates (P, Q) of the bitmap memory 406C. In this case, the pixel position to be referred to in the interpolation processing (P, Q+1), and if the register 805 is considered as the pixel position of interest, data at the coordinates (P, Q+1) is not loaded yet.

In this connection, this embodiment has the following relationship: data to be output from the FIFO buffer 806 is C component data of the pixel of interest (P, Q), and data to be output from the register 805 is (P, Q+1), as shown in FIG. 8. As described above, since the offset amount of the Y-address remains the same for every scan, tone interpolation can be attained using the decimal part value from the coordinate counter 801.

The arrangement and operation of the color shifting correction unit 408C in this embodiment have been explained, and a further detailed description thereof will be given with reference to FIG. 6.

Figure 6:
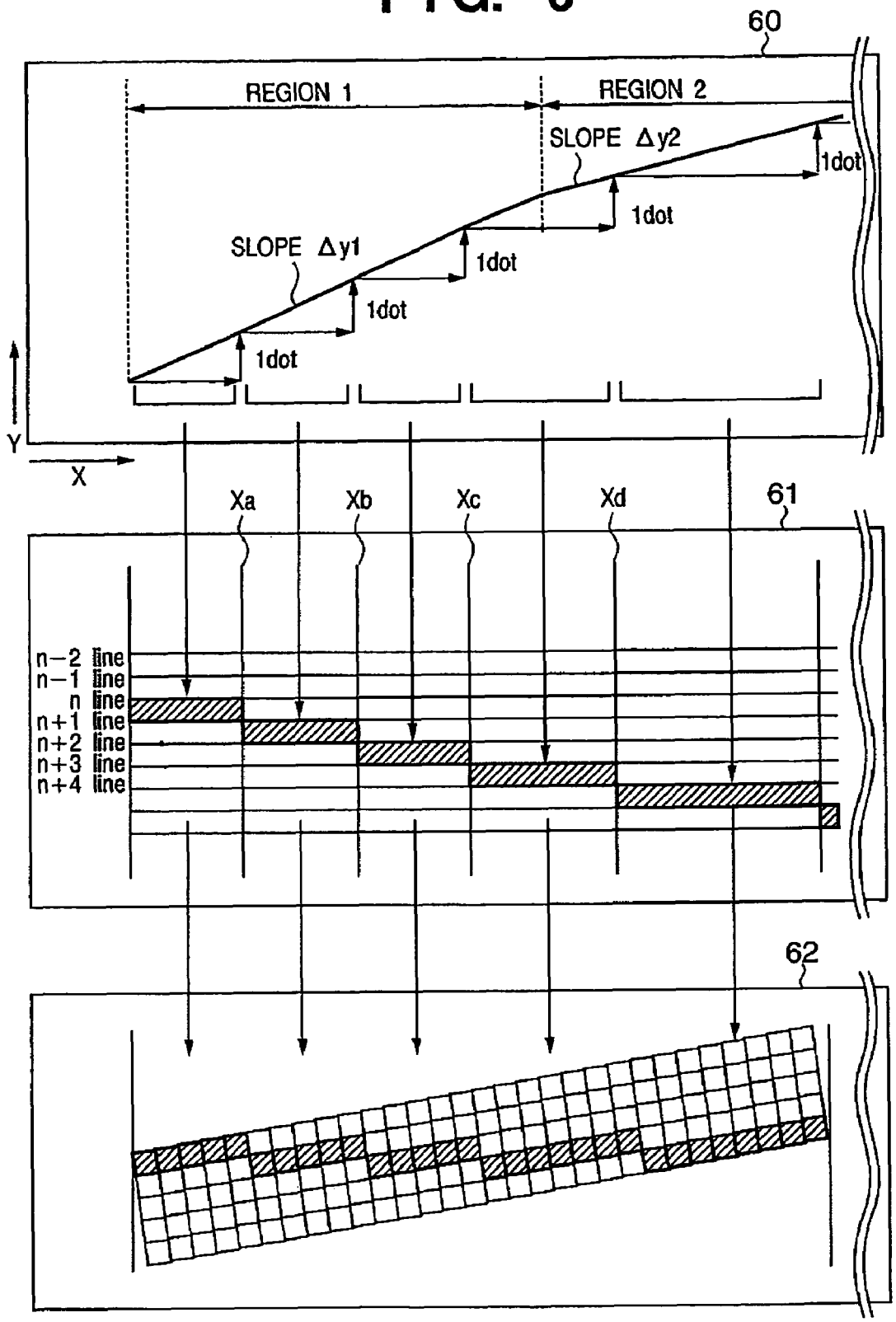
FIG. 6 is a view for explaining the operation for correcting a shifting amount of an integer part of a color shifting correction amount in a coordinate conversion unit.

In FIG. 6, reference numeral 60 denotes a color shifting curve which is plotted on the basis of information stored in the color shifting amount storage unit 403C. The slope of region 1 is $\Delta y1$, and that of region 2 is $\Delta y2$.

Reference numeral 61 denotes the data storage state in the bitmap memory 406C; and 62 (FIG. 6), an exposure image upon exposing image data that has undergone the color shifting correction for respective pixels on the image carrier. Also, the positive direction of the sub-scan of the bitmap memory 406C agrees with the down direction with respect to the plane of the drawing, as indicated by reference numeral 61.

As shown in FIG. 6, while the X-address is being updated, $\Delta y1$ is cumulatively added in turn. However, since no carry to an integer digit occurs before address Xa, the Y-address keeps indicating the n-th line.

When address Xa is reached, a carry to an integer digit occurs, and the Y-address is updated to indicate the (n+1)-th line.

This integer carry occurs when the X-address in FIG. 6 is Xb, Xc, Xd, . . . . Note that a carry occurs at different periods in regions 1 and 2. This is because these regions have different slopes.

FIGS. 7A to 7F show images for explaining color shifting correction less than a pixel unit, i.e., the operation contents for correcting a shifting amount of the decimal part of the color shifting correction slope $\Delta y$ by the tone corrector 804 in this embodiment. A shifting amount of the decimal part is corrected by adjusting the exposure ratios of two neighboring dots in the sub-scan direction.

FIG. 7A shows an image of a main scan line having an upward slope. FIG. 7B shows a bitmap image of a horizontal line before tone correction, and FIG. 7C shows a correction image used to cancel any color shifting due to the slope of the main scan line shown in FIG. 7A. In order to generate the correction image in FIG. 7C, the exposure amounts of two neighboring dots in the sub-scan direction are adjusted. FIG. 7D is a table showing the relationship of the correction slope $\Delta y$ of the color shifting and the correction coefficients used to attain tone correction. k is an integer (truncating the decimal part) of the color shifting correction amount $\Delta y$, and represents a correction amount in the sub-scan direction for each pixel. $\beta$ and $\alpha$ are correction coefficients used to apply correction less than a pixel unit in the sub-scan direction, and their relationship is as described by formula (2) above. That is a is a distribution factor for a preceding dot (data output from the register 805 in FIG. 8) and $\beta$ is that for the dot of interest.

FIG. 7E shows a bitmap image after tone correction for adjusting the exposure ratios of two neighboring dots in the sub-scan direction. FIG. 7F shows an exposure image of the tone-corrected bitmap image on the image carrier. In FIG. 7F, the slope of the main scan line is canceled, and a horizontal straight line is formed.

The color shifting correction unit 408C of this embodiment has been explained. Since the same applies to the color shifting correction units 408M, 408Y, and 408K of other color components M, Y, and K, color shifts among print colors can be set to be less than one pixel at a maximum.

The color-shifting and tone corrected data output from the color shifting correction units 408C, 408M, 408Y, and 408K undergo halftone processing using predetermined halftone patterns in subsequent halftone processors 409C, 409M, 409Y, and 409K, and then undergo pulse width modulation processing in PWM processors 410C, 410M, 410Y, and 410K. These data are then output to the printer engine 401, thus performing exposure processing on the image carriers.

As described above, correction amounts for correcting shifting amounts in the sub-scan direction at respective main scan positions are calculated from an image bitmap, and are re-constructed as a corrected image bitmap, thus generating an image from which a color shifting due to the slope and distortion of the main scan line have been eliminated.

Comparison results upon executing processing in the order of halftone processing→color shifting correction with respect to an input image and upon executing processing in the order of color shifting correction→halftone processing with respect to an input image will be described below.

Figure 9:
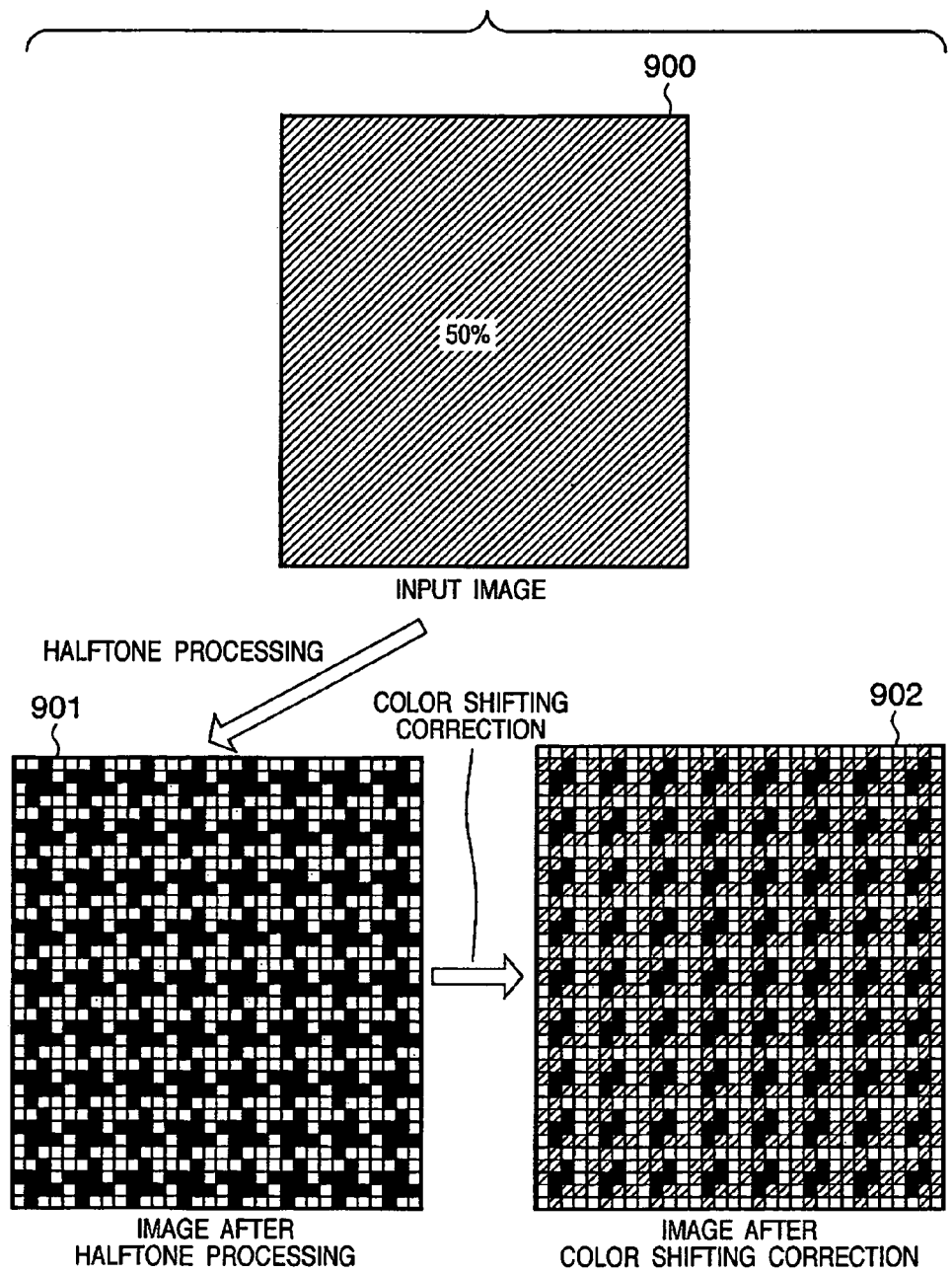
FIG. 9 shows examples of images in respective processes when color shifting correction is performed after halftone processing.

FIG. 9 shows an example upon executing processing in the order of halftone processing→color shifting correction with respect to an input image. In FIG. 9, reference numeral 900 denotes an input image with a constant density of 50%. When the input image 900 undergoes halftone processing using a given 4×4 halftone pattern, an image 901 is obtained. This image 901 is the one to be obtained. However, when an image equivalent to the image 901 is obtained even after color shifting correction is applied to the image 901, the color shifting correction free from image deterioration can be implemented. When the image after the halftone process undergoes ½ pixel color shifting correction in the up direction (vertical direction), an image denoted by reference numeral 902 in FIG. 9 is obtained. As can be seen from FIG. 9, when the image after the halftone processing undergoes the color shifting correction, the reproducibility of halftone dots of the halftone image generated by the halftone processing deteriorates.

Figure 10:
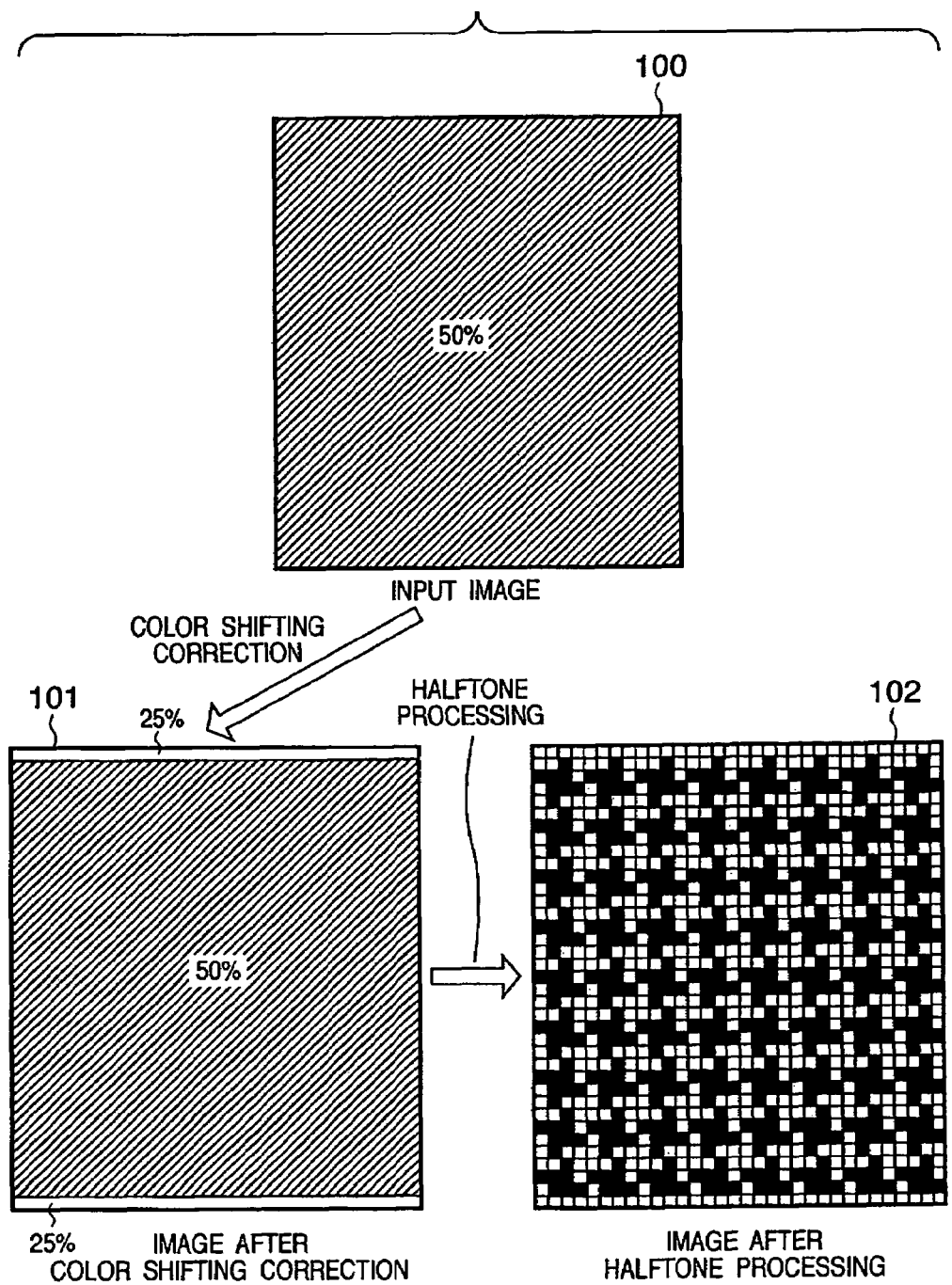
FIG. 10 shows examples of images in respective processes when halftone processing is performed after color shifting correction.

By contrast, FIG. 10 shows an example upon executing processing in the order of color shifting correction→halftone processing with respect to an input image. In FIG. 10, reference numeral 100 denotes an input image, which has a constant density (50%) as in the aforementioned image 900. An image 101 is obtained when ½ pixel color shifting correction in the up direction (vertical direction) is applied to this input image 100. As a result of the color shifting correction, images with a density of 25% are formed on the uppermost and lowermost line portions. An image 102 in FIG. 10 is obtained as a result of the halftone processing applied to this image after the color shifting correction. The image 102 is substantially the same as the image 901 except for the uppermost and lowermost lines. In the image 102, no halftone dot deterioration of the halftone image which is observed in the image 902 is observed, and a high-quality color image can be obtained.

Note that the halftone processing in this embodiment generates 4×4 (m×n in general) patterns from input image data. Since 4×4, 16 different tone expressions are possible. Four-bit (16-tone) multivalued data is assigned to one grid of the 4×4 pattern, and undergoes PWM processing, the 4×4 pattern can consequently express 256 tones.

In this embodiment, the arrangement of the color shifting correction unit 408C (the same applies to other color components) has been exemplified using FIGS. 8 and 11. In case of the arrangement of FIG. 11, the offset (shifting) amount of the Y-address is obtained by cumulatively adding $\Delta y$ in turn in the register 86a in the counter 86. The arithmetic precision of the decimal part of the register 86a is preferably as high as possible. In other words, when the number of bits of the register 86a is small, a round error gradually occurs during cumulative addition of $\Delta y$, and the register value deviate from the paths of the slopes $\Delta y1$ and $\Delta y2$ in FIG. 6.

Therefore, every time the X-address used to load data from the bitmap memory 406C is updated, the offset amount of the Y-address may be calculated according to formulas (1). Since no round error due to cumulative addition occurs, pixel data at positions indicated by the normal paths can be read out.

The arrangement shown in FIG. 4 can also be implemented by software (firmware). In this case, processing that allows image data to flow according to FIG. 4 can be implemented, and such implementation is easy for those who are skilled in the art from the description of this embodiment.

As described above, according to the first embodiment, color shifting correction is done first by calculating the read coordinate position of image data to be printed on the basis of shifting amount information indicating the shifting amount with respect to the scanning direction on the image carrier of each image forming unit, and halftone processing is then executed to print an image, thus suppressing generation of moire due to color shifting correction, and forming a high-quality image.

Second Embodiment

The second embodiment will be described below.

Figure 12:
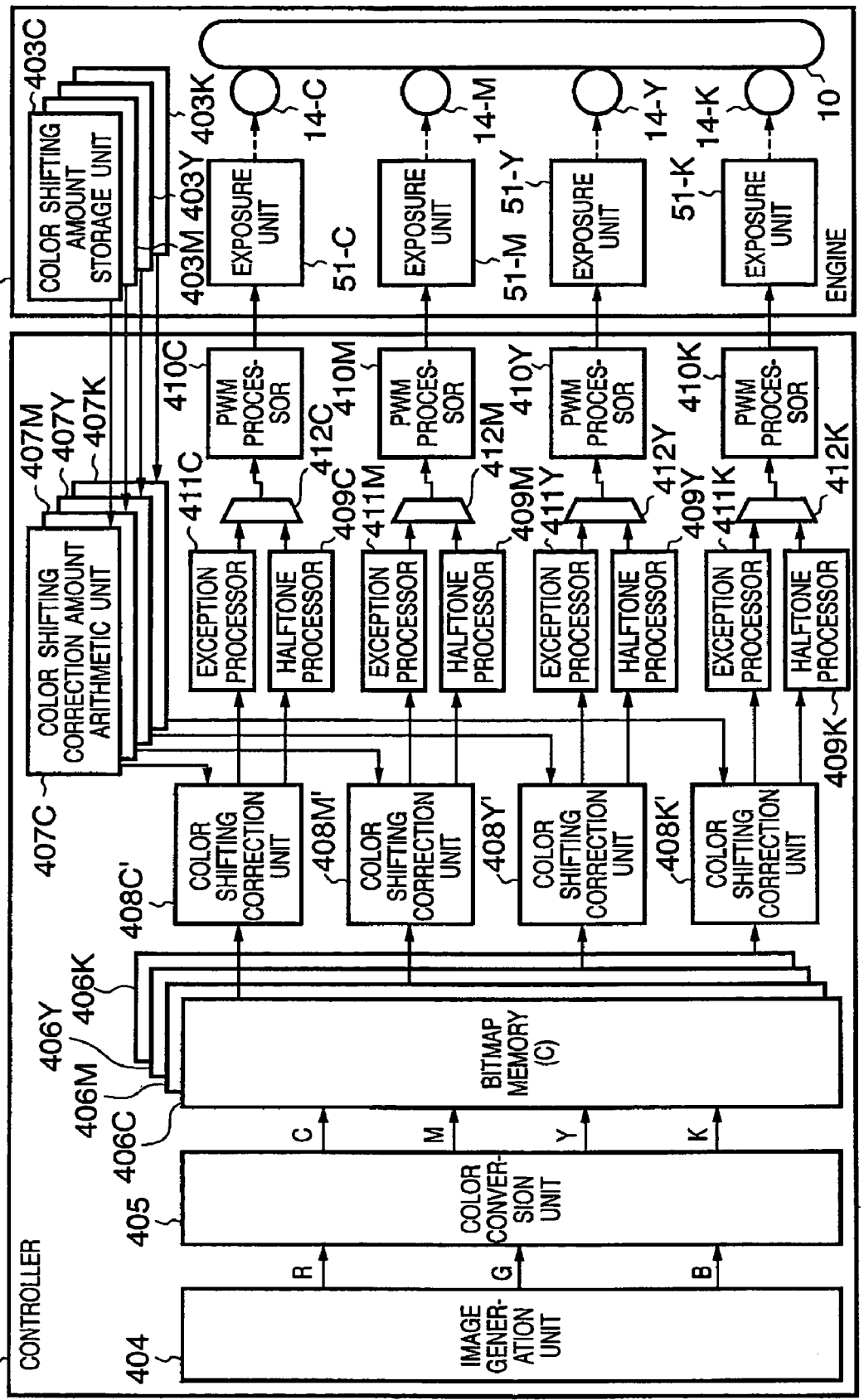
FIG. 12 is a block diagram showing the arrangement of a controller and engine in an image forming apparatus according to the second embodiment of the present invention.

FIG. 12 is a block diagram for explaining the operation of the color shifting correction processing for correcting any color shifting generated due to the slope and curvature of the scan line in the second embodiment. The difference between FIG. 4 in the first embodiment and FIG. 12 is that the color shifting correction units 408C, 408M, 408Y, and 408K are replaced by units 408C', 408M', 408Y', and 408K'. Also, in addition to the color shifting correction units 408C, 408M, 408Y, and 408K, exception processors 411C, 411M, 411Y, and 411K are added, and selectors 412C, 412M, 412Y, and 412K each for selecting one of outputs of the halftone processors 409C, 409M, 409Y, and 409K and those of the exception processors 411C, 411M, 411Y, and 411K are added.

Other arrangements are the same as those of the first embodiment, and differences will be explained below.

The color shifting correction units 408C', 408M', 408Y', and 408K' respectively have different correction amounts but the same arrangements. Hence, the color shifting correction unit 408C' for the C component will be described below.

Figure 13:
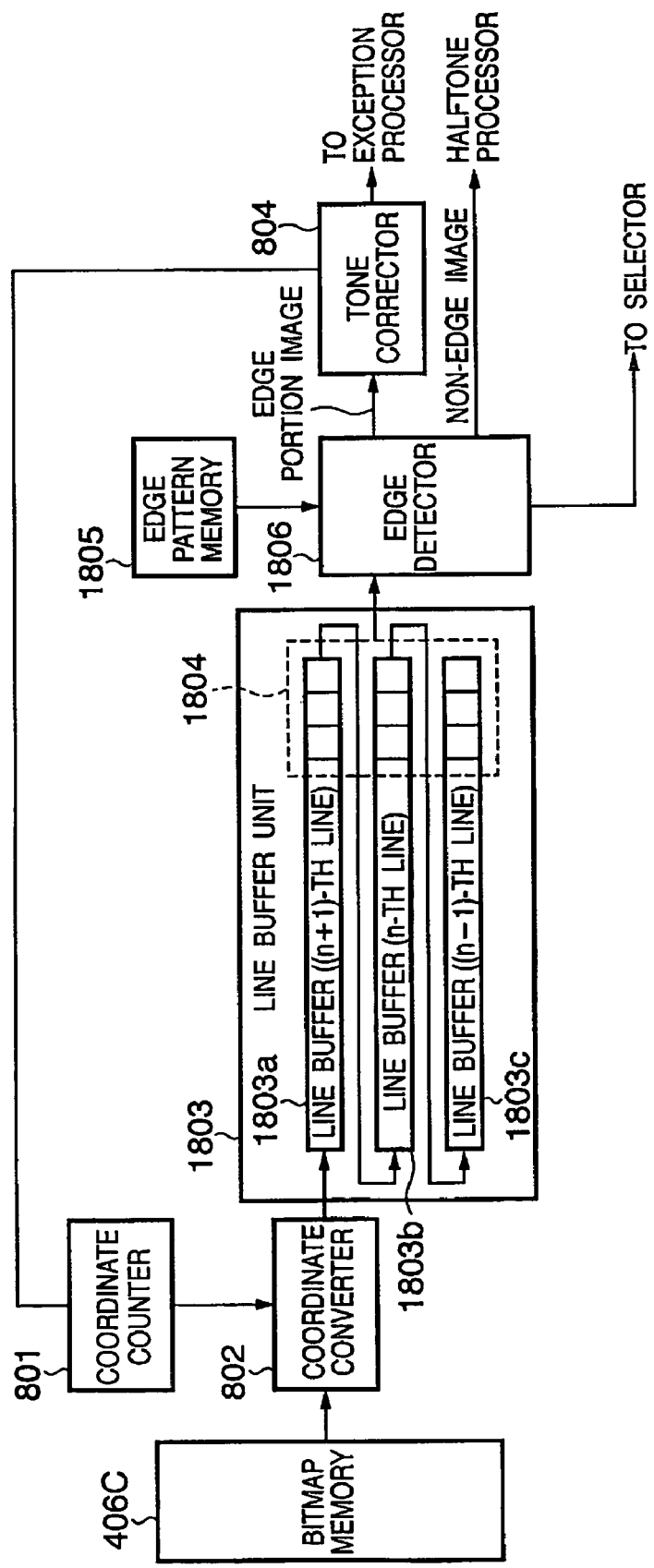
FIG. 13 is a block diagram showing the arrangement of a color shifting correction unit in the second embodiment.

FIG. 13 is a block diagram of the color shifting correction unit 408C' in the second embodiment. The same reference numerals in the arrangement of FIG. 13 denote the same parts as in the arrangement of FIG. 4 of the first embodiment.

The color shifting correction unit 408C' of the second embodiment comprises a coordinate counter 801, coordinate converter 802, line buffer unit 1803, edge pattern memory 1805, edge detector 1806, and tone corrector 804. Of these components, the coordinate counter 801, coordinate converter 802, and tone corrector 804 are the same as those in FIG. 4.

As in the first embodiment, the coordinate counter 801 outputs information required to generate coordinates in the main scan and sub-scan directions, where the color shifting correction processing is to be executed on the basis of formulas (1), to the coordinate converter 802, and outputs information indicating the degree of shifting in the sub-scan direction (a value after the decimal point, as will be described later) to the tone corrector 804.

As in the first embodiment, the coordinate converter 802 makes read access to the bitmap memory 406C using coordinate position data (X-address) in the main scan direction and coordinate position data (Y-address) in the sub-scan direction from the coordinate counter 801. As a result, readout data (C component data in this case) is output to the line buffer unit 1803.

The line buffer unit 1803 includes three line buffers 1803a, 1803b, and 1803c, as shown in FIG. 13, and outputs a 3×3 window 1804 including pixel data of interest (data obtained by coordinate conversion) to the edge detector 1806.

The edge detector 1806 compares the input 3×3 window data and a pattern stored in the edge pattern storage unit 1805, and checks if the pixel of interest at the center of the window belongs to an edge portion of a character/line image or the like. If it is determined that the pixel of interest belongs to an edge portion of a character/line image, the edge detector 1806 outputs a pixel of interest Pn(x) (the line buffer 1803b that stores image data of the n-th line) and pixel data Pn+1(x) at the same main scan coordinate position of the (n+1)-th line (the line buffer 1803a) to the tone corrector 804, which executes tone correction.

On the other hand, if it is determined that the pixel of interest does not belong to an edge of a character/line image, i.e., if it is determined that the pixel of interest belongs to a tone image such as a photo image or the like, the tone correction is skipped, and halftone processing is executed by the halftone processor 409C.

At this time, a signal indicating whether or not the edge detector 1806 detects an edge, i.e., if a matching pattern in the edge pattern memory 1802 is found is output to the selector 412C. As a result, the selector 412C selects one of data from the exception processor 411C and halftone processor 409C, and outputs the selected data.

The processing of the color correction unit 408C' of the second embodiment has been described. The same applies to the color shifting correction units 408M', 408Y', and 408K' of other color components.

Note that an object which is to undergo tone correction by the tone corrector 804 is an edge portion of a character/line image or the like according to the second embodiment.

The exception processors 411C, 411M, 411Y, and 411K of the second embodiment will be described below.

A case upon executing processing in the order of halftone processing color shifting correction with respect to an input image and a case upon executing processing in the order of color shifting correction halftone processing with respect to an input image will be examined below.

FIG. 9 shows an example upon executing processing in the order of halftone processing→color shifting correction with respect to an input image. In FIG. 9, reference numeral 900 denotes an input image with a constant density of 50%. When the input image 900 undergoes halftone processing using a given 4×4 halftone pattern, an image 901 is obtained. This image 901 is the one to be obtained. However, when an image equivalent to the image 901 is obtained even after color shifting correction is applied to the image 901, the color shifting correction free from image deterioration can be implemented. When the image after the halftone process undergoes ½ pixel color shifting correction in the up direction (vertical direction), an image denoted by reference numeral 902 in FIG. 9 is obtained. As can be seen from FIG. 9, when the image after the halftone processing undergoes the color shifting correction, the reproducibility of halftone dots of the halftone image generated by the halftone processing deteriorates.

By contrast, FIG. 10 shows an example upon executing processing in the order of color shifting→correction halftone processing with respect to an input image. In FIG. 10, reference numeral 100 denotes an input image, which has a constant density (50%) as in the aforementioned image 900. An image 101 is obtained when ½ pixel color shifting correction in the up direction (vertical direction) is applied to this input image 100. As a result of the color shifting correction, images with a density of 25% are formed on the uppermost and lowermost line portions. An image 102 in FIG. 10 is obtained as a result of the halftone processing applied to this image after the color shifting correction. The image 102 is substantially the same as the image 901 except for the uppermost and lowermost lines. In the image 102, no halftone dot deterioration of the halftone image which is observed in the image 902 is observed, and a high-quality color image can be obtained.

That is, in case of an image having no edge like the images 900 and 100, image deterioration can be suppressed by applying halftone processing to an image that has undergone color shifting correction.

Figure 14:
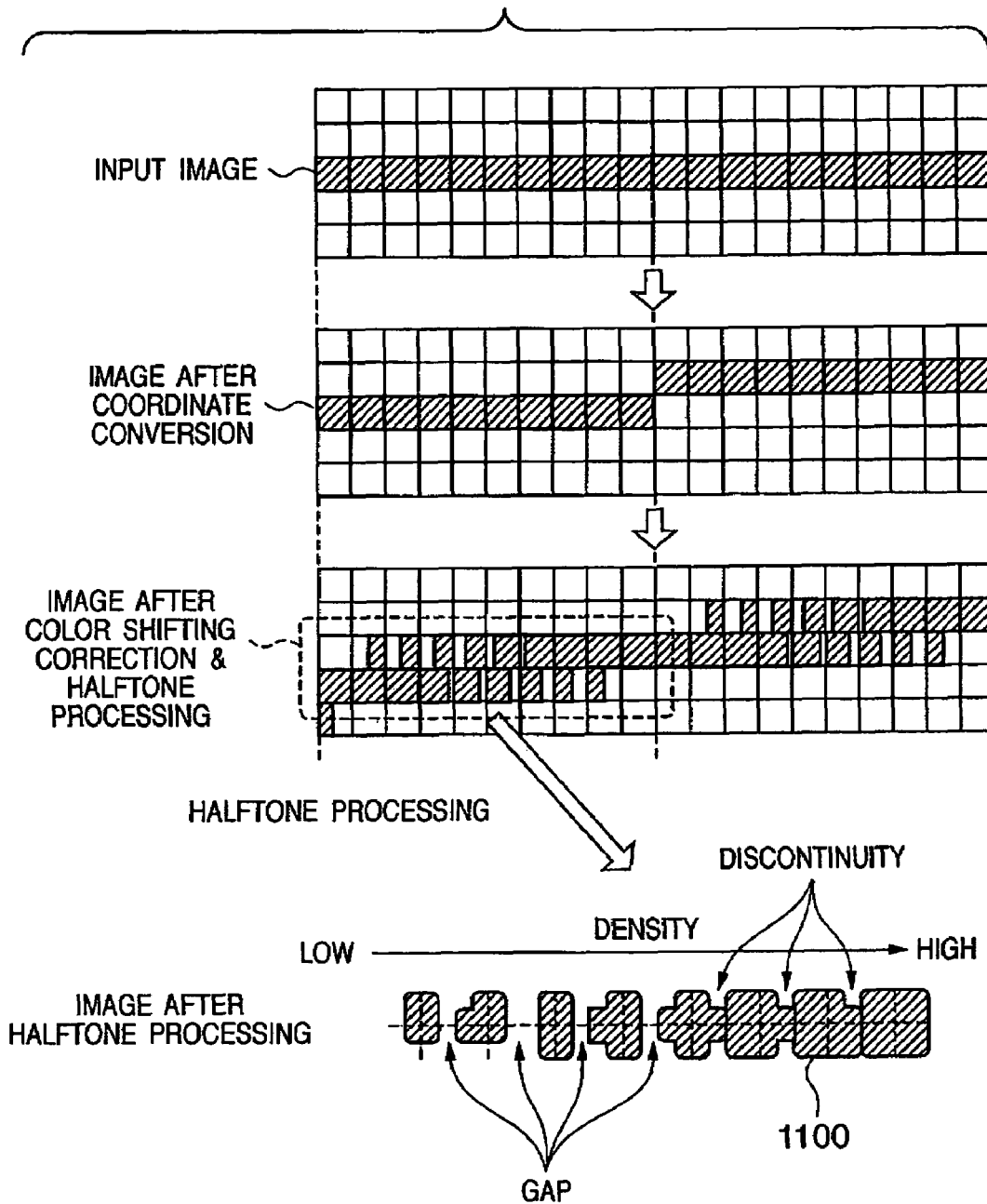
FIG. 14 is a view for explaining the reason why normal halftone processing is not performed at an edge portion of a character/line image in the second embodiment.

On the other hand, in case of an image edge portion whose density changes abruptly with respect to a surrounding portion like a character, line image, or the like, as shown in FIG. 14, since an edge portion is formed in accordance with a halftone pattern by halftone processing, tone correction is invalidated, and gaps and discontinuities are generated at an edge portion of an image generated by exposure suffers gap, like reference symbol 1100 in FIG. 14. As a result, jaggy is generated at the image edge portion of a character/line image, or the like.

In order to prevent this, exception processing is applied to an image after color shifting correction for the image edge portion of a character/line image, or the like.

The exception processor 411C (the same applies to the processors 411M, 411Y, and 411K) executes exception processing different from normal halftone processing for an image from which an edge is detected by the edge detector 1806.

There are three types of exception processing, as follows.

No halftone processing is applied (through). In this case, since no halftone processing is applied to an image from which an edge is detected by the edge detector 1806, gaps and discontinuities caused at an edge portion by the halftone processing can be prevented.

Halftone processing is applied using a halftone pattern for an edge portion. When a normal halftone pattern is used at the edge portion, as shown in FIG. 14, gaps and discontinuities are generated depending on the growth direction of the halftone pattern. Hence, when a halftone pattern having a growth direction from a normal one is used for the edge portion, gaps and discontinuities generated using the normal halftone pattern can be prevented.

Processing for compensating for dots after normal halftone processing or the like is executed. After the normal halftone processing, dots are compensated for gaps and discontinuous portions to compensate for the gaps and discontinuities. In this way, any gaps and discontinuities generated by the normal halftone processing can be compensated for.

By contrast, the halftone processor 409C (the same applies to the processors 409M, 409Y, and 409K) applies normal halftone processing to an image with a non-edge portion.

Figure 15:
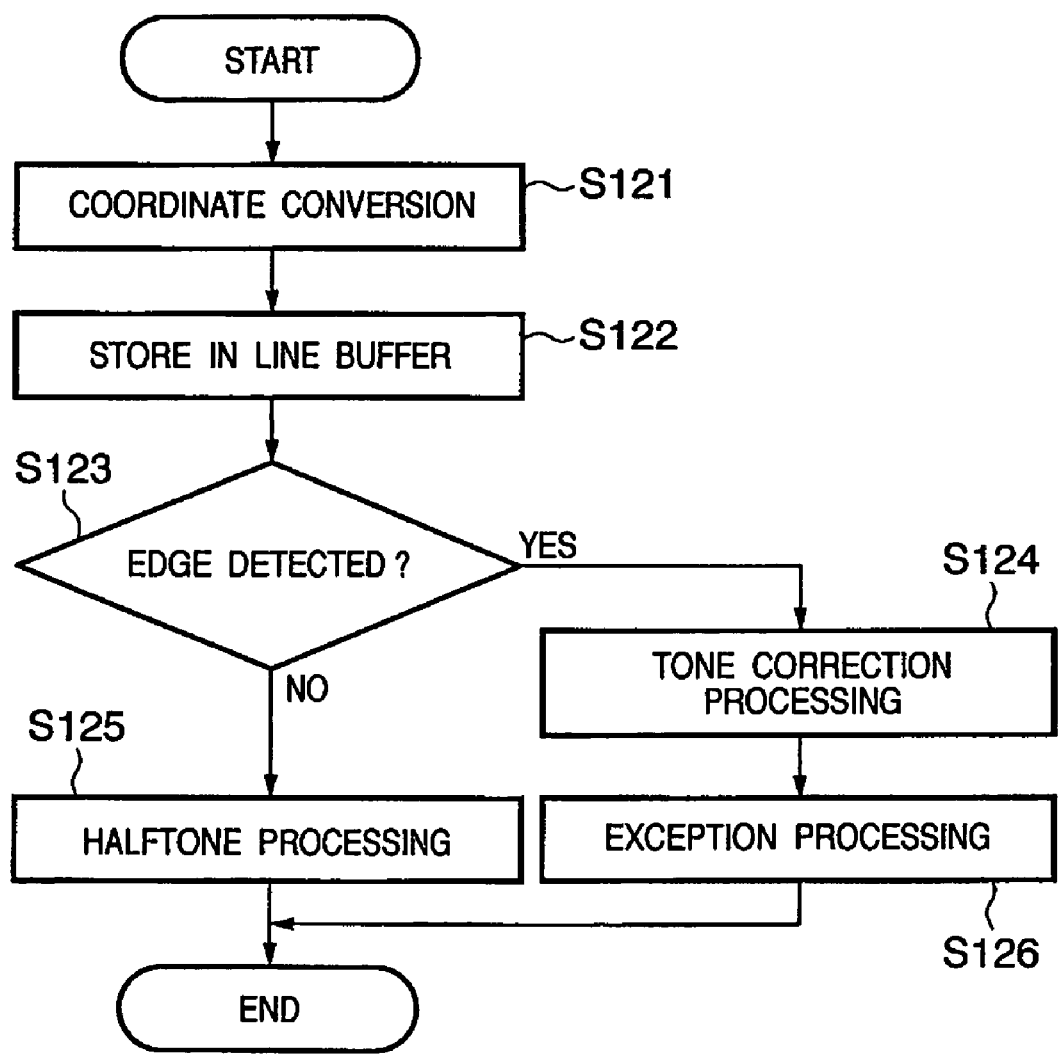
FIG. 15 is a flowchart showing switching processing based on an image edge determination result in the second embodiment.

The flow of a series of processes can be executed, as shown in FIG. 15.

In step S121, coordinate conversion is executed using the coordinate converter 802 to correct a color shifting equal to or larger than one line.

In step S122, the converted data obtained by the coordinate converter 802 is stored in the line buffer unit 1803.

In step S123, the edge detector 1806 detects an edge portion of a character/line image or the like. If an edge is detected, the flow advances to step S124; otherwise, the flow advances to step S125.

In step S124, the tone corrector 804 applies tone correction to an image with an edge portion to execute color shifting correction less than one pixel. Then, exception processing in step S126 is executed. That is, exception processing such as halftone processing using a halftone pattern different from a normal pattern, processing for adding dots to discontinuous portions and gaps generated by halftone processing, or the like is executed.

On the other hand, if an image with a non-edge is detected, halftone processing is executed in step S125.

Pulse width modulation is made on the basis of image data obtained from one of the aforementioned exception processor 411C or halftone processor 409C to be converted into a binary laser drive signal, which is then supplied to an exposure unit to make exposure. The same processing as in the above processing is similarly applied to other color components M, Y, and K.

As described above, according to the second embodiment, color shifting correction is done first by calculating the read coordinate position of image data to be printed on the basis of shifting amount information indicating the shifting amount with respect to the scanning direction on the image carrier of each image forming unit. After that, halftone processing is then executed to print an image, thus suppressing generation of moire due to color shifting correction. Furthermore, as for an edge of a character/line image, generation of jaggedness can be suppressed, and a high-quality image can be formed.

Third Embodiment

The third embodiment will be described below.

Figure 16:
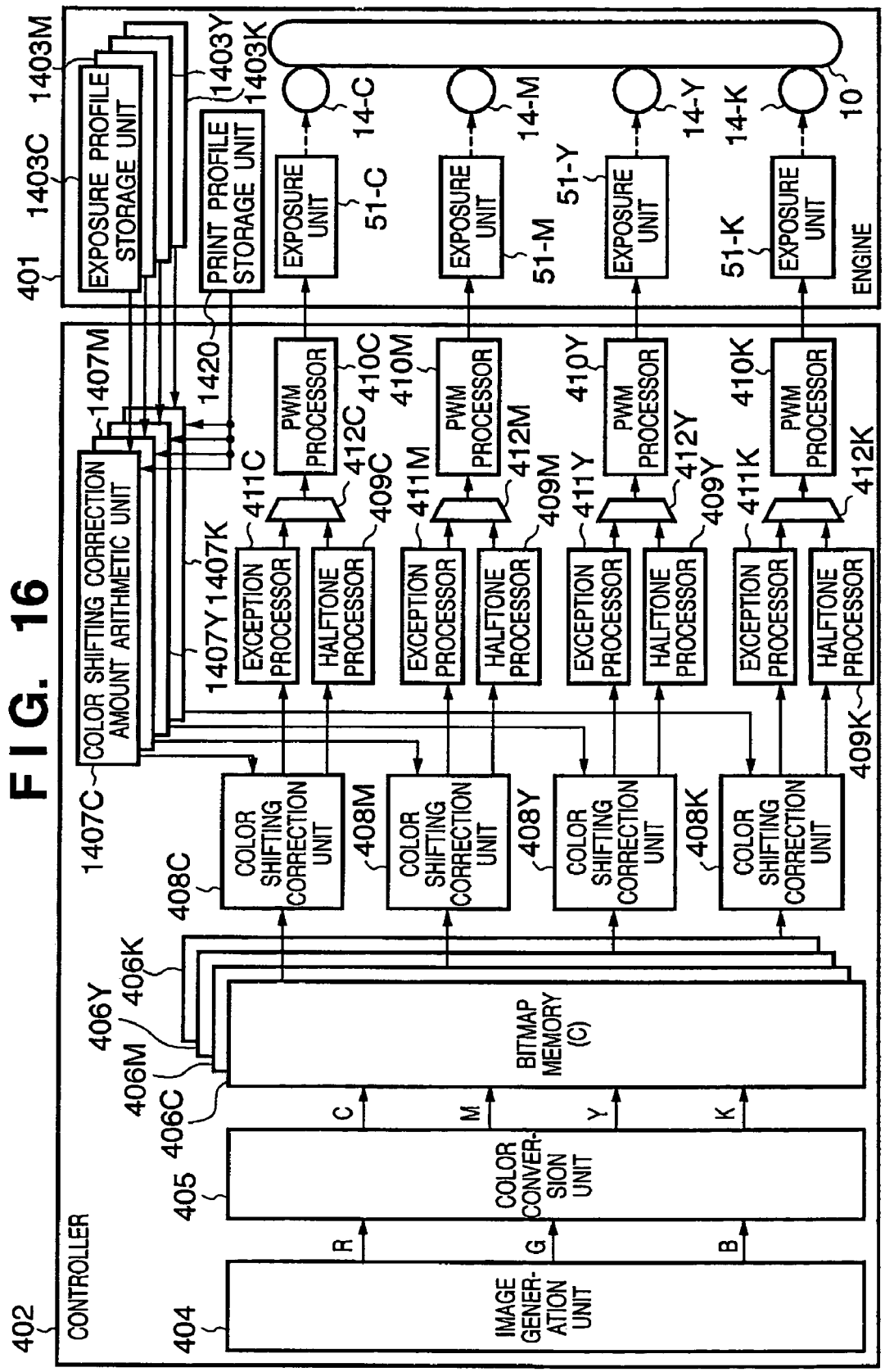
FIG. 16 is a block diagram showing the arrangement of a controller and engine in an image forming apparatus according to the third embodiment of the present invention.

FIG. 16 is a block diagram for explaining the operation of the color shifting correction processing for correcting any color shifting generated due to the slope and curvature of the scan line in the third embodiment. The difference between FIG. 12 in the second embodiment and FIG. 16 is that the engine 401 comprises exposure profile storage units 1403C, 1403M, 1403Y, and 1403K, and a print profile storage unit 1420. Based on this, color shifting correction amount arithmetic units 1407C, 1407M, 1407Y, and 1407K are arranged.

The exposure profile storage units 1403C, 1403M, 1403Y, and 1403K store the same data as in the color shifting amount storage units 403C, 403M, 403Y, and 403K in the first and second embodiments. That is, the exposure profile storage units 1403C, 1403M, 1403Y, and 1403K receive and hold the shifting amount information for respective image forming units of respective colors in the manufacturing process of the apparatus. For example, each exposure profile storage unit can be implemented by a writable, nonvolatile memory such as an EEPROM or the like. In FIG. 16, the exposure profile storage units are assured for respective color components. However, since the information size to be stored is sufficiently small, one memory element may store the color shifting amounts for all the color components.

The print profile storage unit 1420 stores configuration information associated with print processing in the printer engine 401. The print profile storage unit 1420 also comprises a writable, nonvolatile memory.

The color shifting correction amount arithmetic unit 1407C (the same applies to the units 1407M, 1407Y, and 1407K) calculates a color shifting correction amount on the basis of data from the exposure profile storage unit 1403C and print profile storage unit 1420.

Since arrangements other than those described above are the same as the second embodiment, the same reference numerals denote such components, and refer to the first and second embodiment for a description thereof.

The exposure profile storage unit 1403C (the same applies to the units 1403M, 1403Y, and 1403K, but information to be stored differs depending on individual differences) stores the same data as in the color shifting amount storage units 403C, 403M, 403Y, and 403K in the first and second embodiments, as described above. Therefore, processing based only on this data is the same as the first and second embodiments, and a description thereof will be omitted.

A characteristic feature of the third embodiment lies in that a color shifting correction amount is calculated in consideration of information stored in the print profile storage unit 1420.

Figure 17:
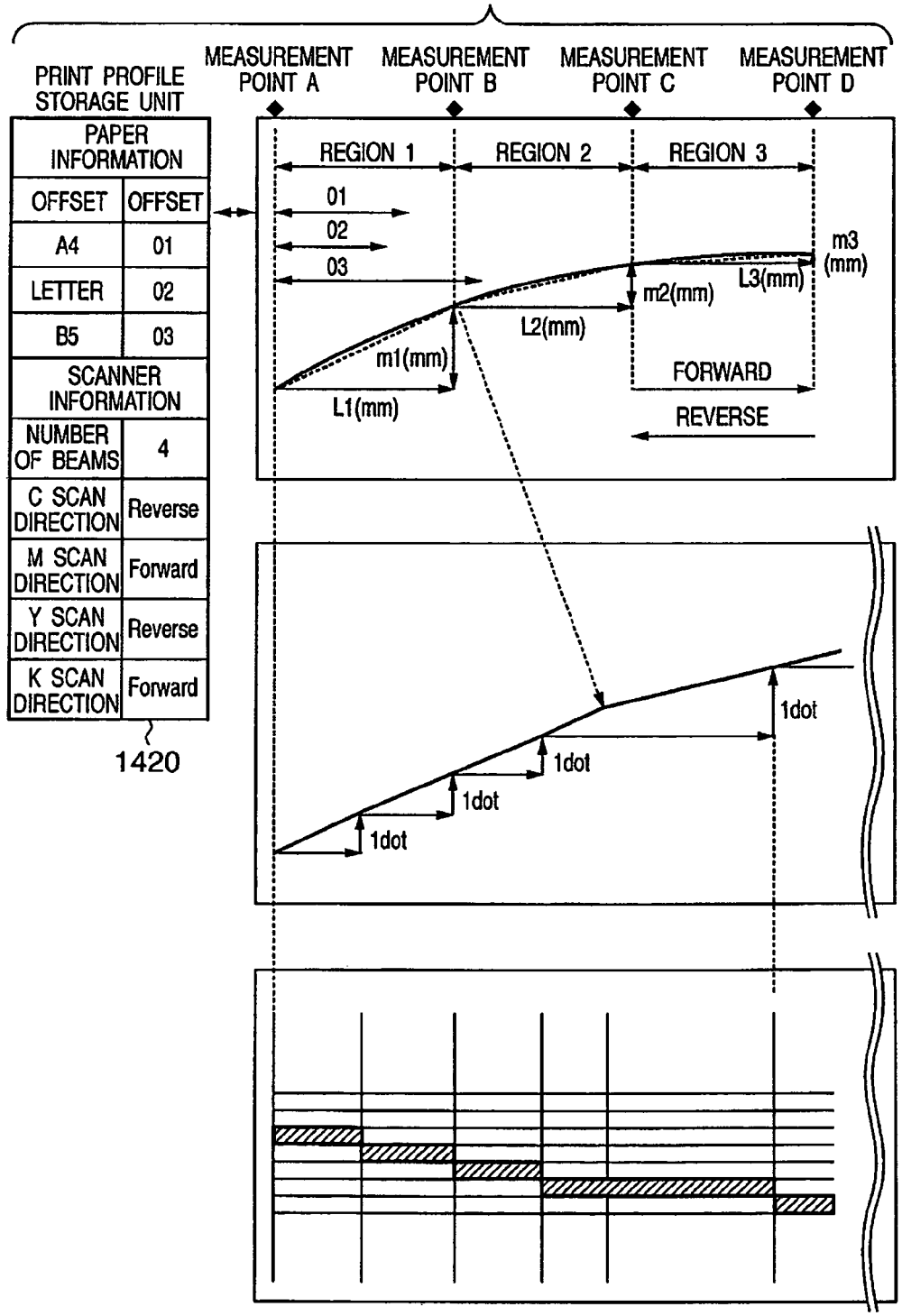
FIG. 17 is a view showing the relationship between an exposure profile and print profile in the third embodiment.

FIG. 17 shows the relationship between an exposure profile stored in the exposure profile storage unit 1403C and a print profile stored in the print profile storage unit 1420.

The slope amounts based on the scanning exposure directions and the number of scanning beams (FIG. 17 shows that the number of beams generated by the respective image forming units is 4) will be examined using FIGS. 18A to 18C.

FIG. 18A shows an example wherein a 1-dot line is scanned per scan, and the scanning directions of M (magenta) and C (cyan) components are opposite to each other. FIG. 18B shows an example of 2-dot lines per scan (two pairs of laser elements and polygonal mirrors). FIG. 18C shows an example of 4-dot lines per scan.

The example of FIG. 18A will be explained below. The exposure start positions of images are 4*m* for magenta, and 4*c* for cyan. However, since the scanning directions of these color components are opposite to each other, the positions of dots upon completion of scanning of a main scan image region are 4*m'* and 4*c'*. Let Lmax be the moving distance (exposure range) of a beam per scan, and mdot be the distance between dots. Then, the slope based on the above positional relationship is given by:

mdot/Lmax

The slopes based on the dot positional relationships in FIGS. 18B and 18C are:

2 beams: 2*mdot/Lmax 4 beams: 4*mdot/Lmax

Let n be the number of beams used per scan. Then, the slope is given by:

n*mdot/Lmax

Also, if the shifting direction in FIG. 3 is a positive, an arithmetic operation is made by adding counting of slopes to have a negative sign in the case of Forward scanning and a positive sign in the case of Reverse scanning.

Figure 19A:
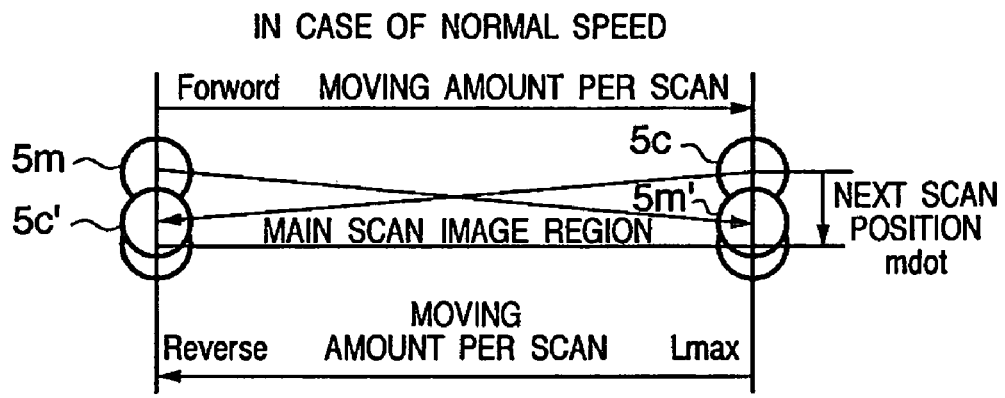
FIGS. 19A to 19C are views for explaining the relationship between the print speed and exposure tilt.
Figure 19B:
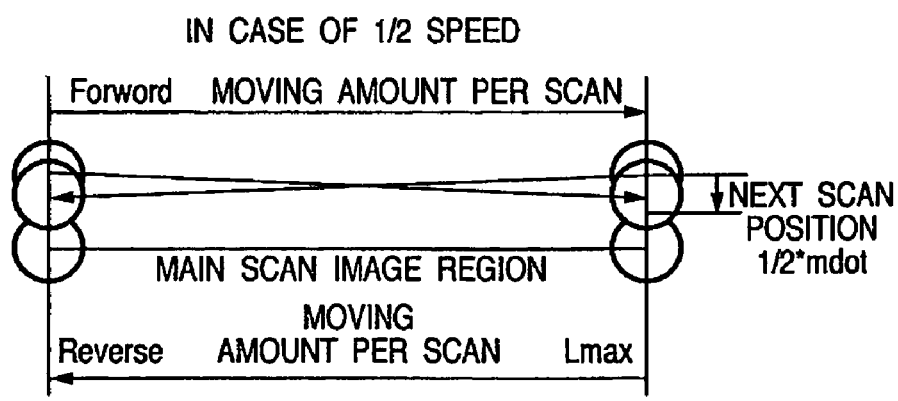
Figure 19C:
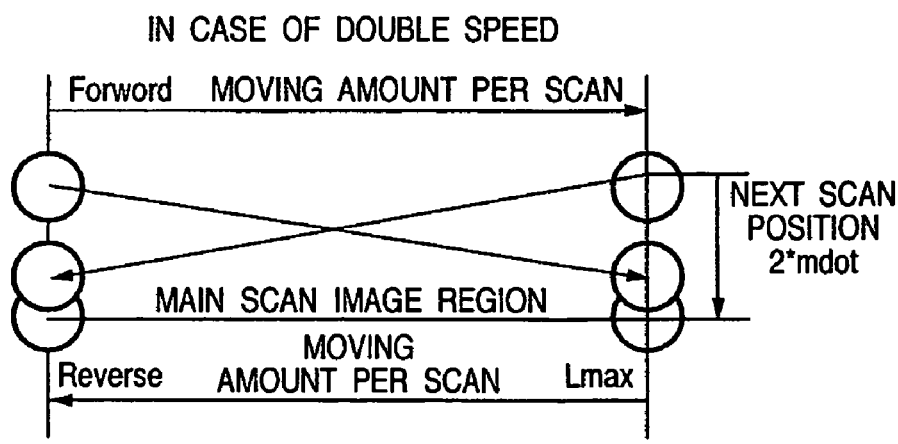

FIGS. 19A to 19C show examples when print speeds are different. These examples will be described using FIGS. 19A to 19C.

FIG. 19A shows an example at a normal speed, FIG. 19B shows an example at a half speed, and FIG. 19C shows an example at a double speed.

As shown in FIG. 19B, in case of the double speed (the rotational speed of the photosensitive drum is half the normal speed), since image output processing is made in one main scan of two main scans, an arithmetic operation is made to halve the slope coefficient of a slope calculated based on the number of beams.

As shown in FIG. 19C, in case of the double speed, since the photosensitive body moves for two scans per main scan, an arithmetic operation is made to double the slope coefficient of a slope calculated based on the number of beams.

If the print speed is k times a normal speed, the slope obtained based on the number of beams and print speed is given by:

k*n*mdot/Lmax

Therefore, a deviation y in the sub-scan direction from the reference Y-coordinate in all the regions as well as the exposure profile and print profile is given, in the case of the Forward scanning direction, by:

$$y = -x*k*n*mdot/Lmax + x*(m1/L1)(0 \le x < L)$$

$$= -x*k*n*mdot/Lmax + m1/Ldot + (x - L/Ldot)*(m2/L)$$
$$(L \le x < 2L)$$

$$= -x*k*n*mdot/Lmax + (m1+m2)/Ldot + (x - 2L/Ldot)*$$
$$(m3/L)(2L \le x \le 3L)$$

Note that calculations are made to have L2=2*L1 and L3=3*L1 in FIG. 3.

In case of the Reverse scanning direction, $$y = x*k*n*mdot/Lmax + x*(m1/L1)(0 \le x < L)$$

$$= x*k*n*mdot/Lmax + m1/Ldot + (x - L/Ldot)*(m2/L)$$
$$(L \le x < 2L)$$

$$= x*k*n*mdot/Lmax + (m1+m2)/Ldot + (x - 2L/Ldot)*$$
$$(m3/L)(2L \le x \le 3L)$$

In the print processing, the exposure start position differs depending on the paper sizes. That is, the offset position of the X-address must be changed. For this reason, y used in the coordinate conversion processing in the sub-scan direction of an image starts from Yobj at the offset position. A correction amount in the vertical direction at the offset position can be calculated using a formula used to calculate y.

Therefore, when the arrangement shown in FIG. 3 is adopted, the position of each region may be set in the register 82 shown in FIG. 11 depending on as to whether or the exposure direction of each image forming unit is Forward or Reverse, and a composite slope based on the exposure and print profiles may be set in the register 84.

As described above, according to the third embodiment which is made to solve the aforementioned problems, color shifting correction is done first by calculating the read coordinate position of image data to be printed on the basis of shifting amount information indicating the shifting amount with respect to the scanning direction on the image carrier of each image forming unit. After that, halftone processing is then executed to print an image, thus suppressing generation of moire due to color shifting correction. Furthermore, as for an edge of a character/line image, generation of jaggedness can be suppressed, and a high-quality image can be formed.

Fourth Embodiment

In the first to third embodiments, the example in which the address used to load image data from each of the bitmap memories 406C, 406M, 406Y, and 406K is generated by the arrangement shown in FIG. 11 has been explained.

When the arrangement shown in FIG. 11 is adopted, every time the X-address is updated, Δy including a decimal point must be cumulatively counted. Once scanning exposure for one page starts, the offset amount (integer part, decimal part) to the Y-axis remains the same as long as if the X-coordinate is the same for respective scans. Hence, Y-axis offset addresses and weighting coefficients may be calculated in advance by arithmetic operations, and are stored in a table. Upon actual scans, the weighting coefficients for coordinate conversion and tone correction may be read out with reference to this table upon processing.

Figure 20:
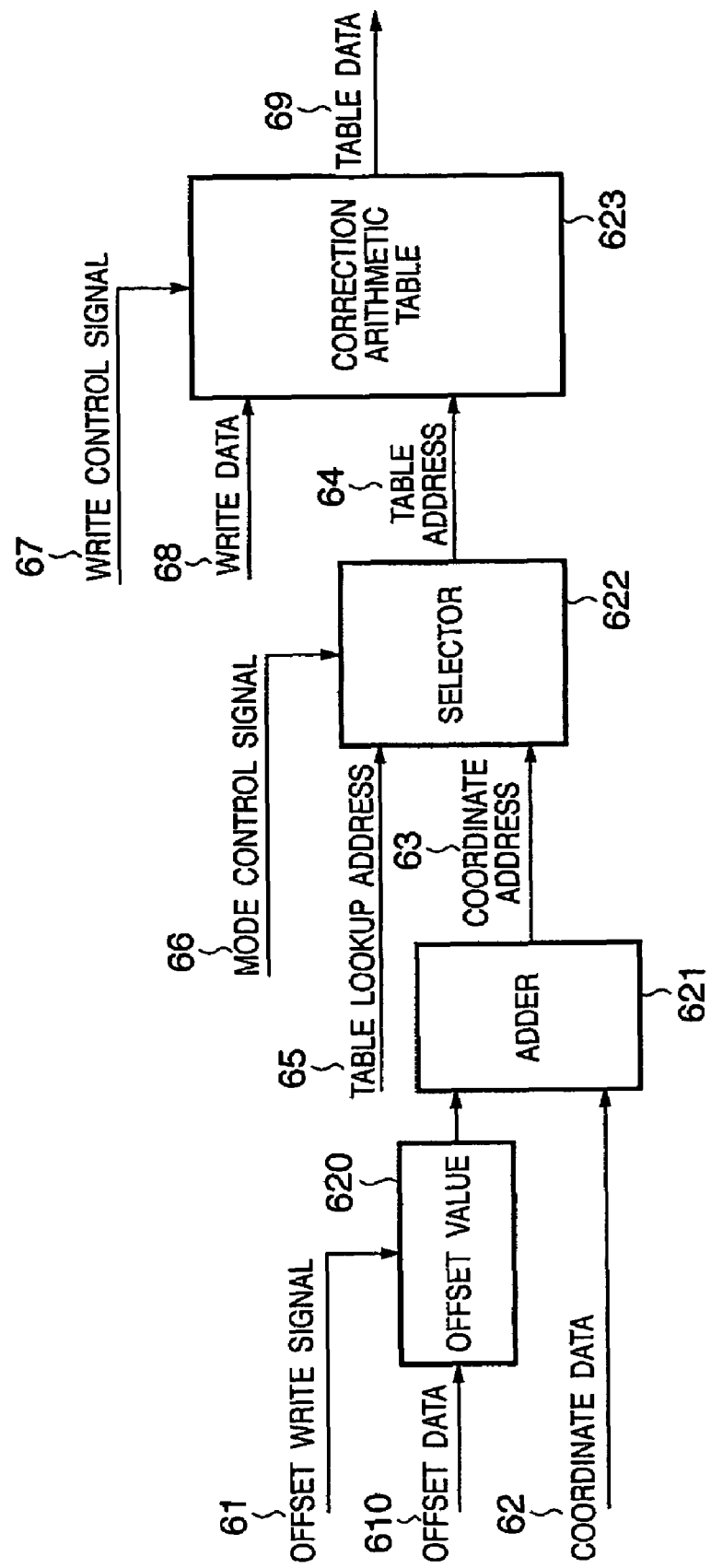
FIG. 20 is a block diagram showing the arrangement of a coordinate counter according to the fourth embodiment of the present invention.
Figure 21:
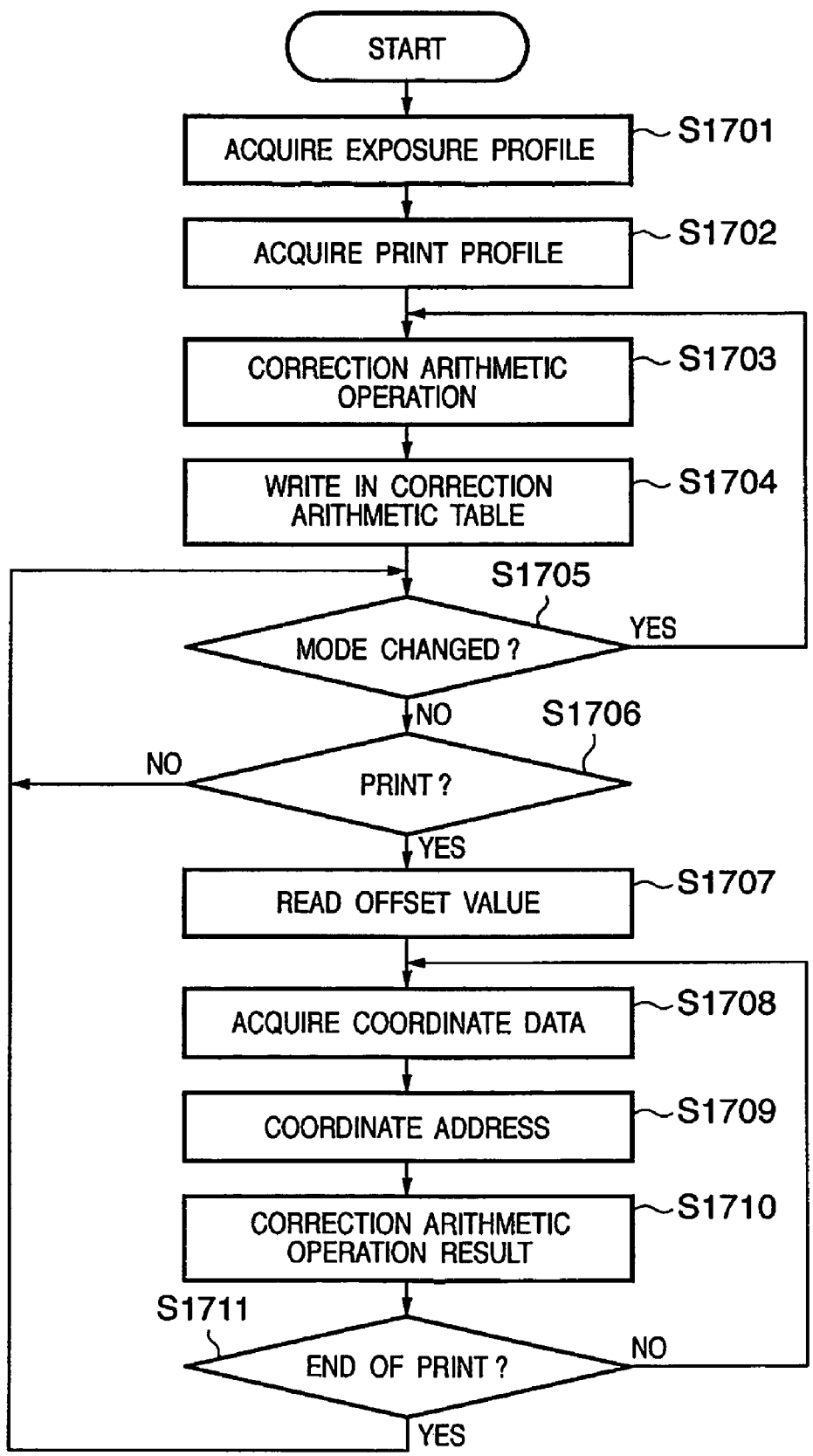
FIG. 21 is a flowchart showing the print processing sequence in the fourth embodiment.

FIG. 20 shows the arrangement of the coordinate counter 801 upon implementing such processing, and FIG. 21 shows the flow of processing associated with that arrangement.

As described above, this arithmetic processing need only be determined once depending on the engine state (including a print mode). A CPU (not shown) in this image processing apparatus executes the arithmetic processing, and stores that result in a correction arithmetic table 623. This write process is made upon starting up the image processing apparatus or upon changing the print speed. A selector 622 supplies a table lookup address 65 as a table address 64 to the correction arithmetic table 623 when the CPU (not shown) requires access to the correction arithmetic table 623. When the CPU does not make any access, a coordinate address from an adder 621 is used as the table address 64. At this time, a register 620 which stores an offset value is set with an offset (O1, O2, O3, or the like in FIG. 17) depending on the print medium size and orientation.

When the print processing starts, since the size and orientation of sheets to be printed are determined, the CPU (not shown) sets the offset of the X-address by writing it as offset data 610 in the offset value register 620.

In the above arrangement, the CPU writes the integer parts of the sums of slopes Δy and weighting coefficients α and β in turn from the X-address offset in the correction arithmetic table 623. In the table below, assume that the slope Δy=+0.2.

| Write address | Y-address offset | Weighting coefficient α | Weighting coefficient β |
|---|---|---|---|
| 0 | 0 | 0.0 | 1.0 |
| 1 | 0 | 0.2 | 0.8 |
| 2 | 0 | 0.4 | 0.6 |
| 3 | 0 | 0.6 | 0.4 |
| 4 | 0 | 0.8 | 0.2 |
| 5 | 1 | 0.0 | 1.0 |
| 6 | 1 | 0.2 | 0.8 |
| 7 | 1 | 0.4 | 0.6 |
| 8 | 1 | 0.6 | 0.4 |
| . | . | . | . |
| . | . | . | . |
| . | . | . | . |

The coordinate counter 801 supplies a corresponding Y-address offset value to the coordinate converter 802 in accordance with the X-address. At the same time, the coordinate counter 801 outputs the values α and β to the tone corrector 804. As a result, since the coordinate converter 802 can obviate the need for the addition processing including the decimal point, and the tone corrector 804 need not execute processing for calculating α and β, the load can be reduced.

The processing in this embodiment upon implementing the aforementioned processing can be processed according to the flowchart of FIG. 21. The processing for only the C component will be described below, but the same applies to other components. Note that a description will be given with reference to the third embodiment.

In step S1701, an exposure profiles are loaded from the exposure profile storage unit 1403C (the same applies to the units 1403M, 1403Y, and 1403K). In step S1702, a print profile is loaded from the print profile storage unit 1420.

After that, the flow advances to step S1703, and correction data based on these profiles (X-address offset values, Y-address offset values, and weighting coefficients α and β) are calculated in consideration of the print mode (the size and conveying direction of print sheets, print speed, and the like). In step S1704, these calculated data are stored at corresponding address positions of the correction arithmetic table 623.

It is checked in step S1705 if the print mode is changed. If it is determined that the print mode is changed, the processes in step S1703 and S1704 are executed again. That is, the contents of the correction arithmetic table 623 are updated.

If it is detected in step S1706 that print processing starts, the flow advances to step S1707 to load the offset value from the correction arithmetic table 623. In step S1708, coordinate data are determined. In step S1709, data at the corresponding coordinate position is read out from the bitmap memory 406C. In step S1710, correction processing (interpolation processing, exception processing) is executed. Then, the processes in step S1708 and subsequent steps are repeated until it is determined in step S1711 that the print processing is complete.

Figure 22:
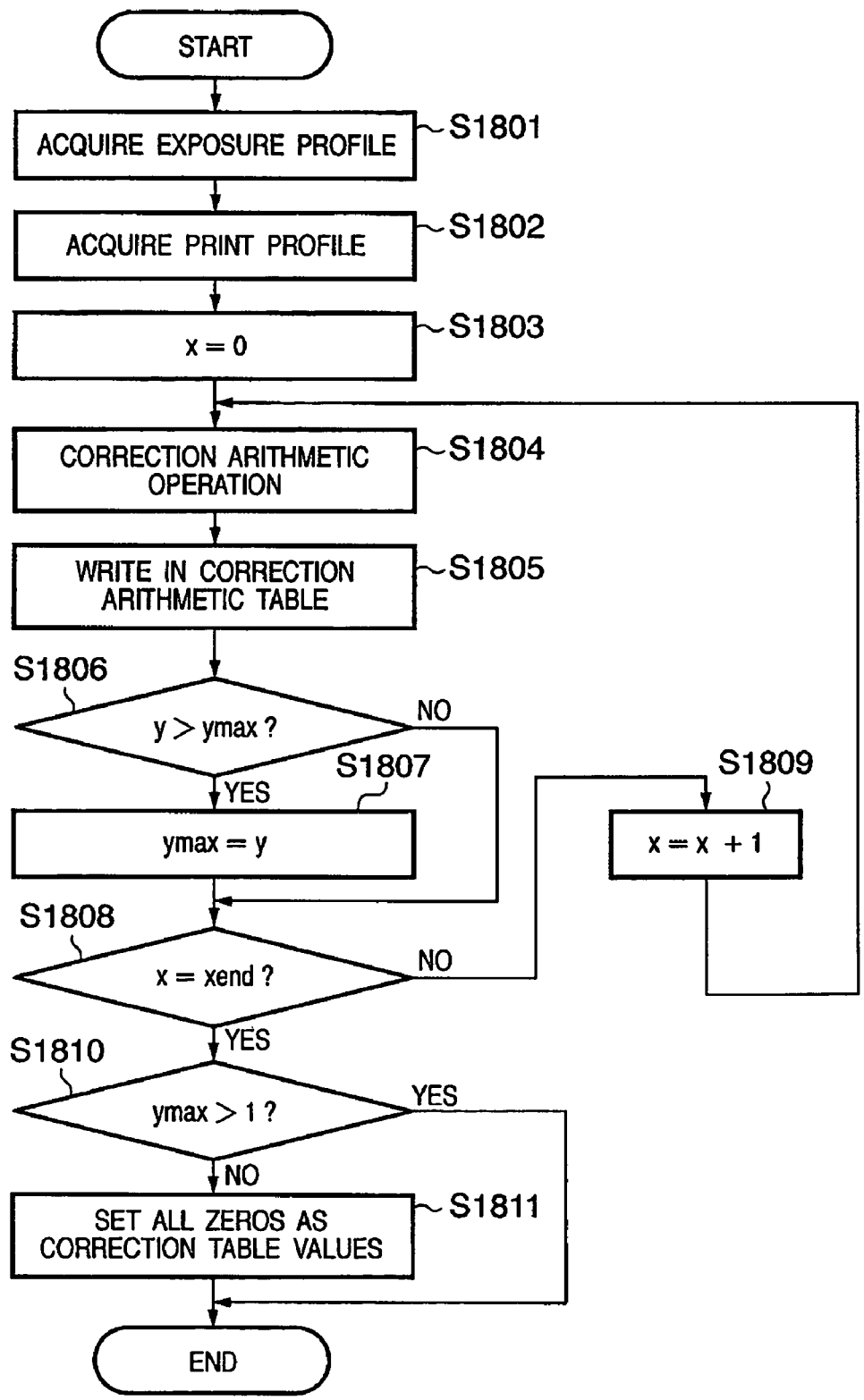
FIG. 22 is a flowchart showing the write processing sequence in a correction table in the fourth embodiment.

As the correction arithmetic processing in step S1703 and the write processing in step S1704 in the above processes, processing shown in FIG. 22 can be executed. A description will be given with reference to FIG. 22.

In steps S1801 and S1802, an exposure profile and print profile are loaded. In step S1803, a variable x indicating the X-address is reset to "0".

After that, in step S1804, the Y-address offset value, and weighting coefficients α and β for the variable x are calculated. In step S1805, the calculated data are written in the correction arithmetic table 623. After that, it is checked in step S1806 if the Y-address offset value exceeds a variable ymax that holds a maximum offset (which is reset to zero in an initial state). If it is determined that the offset value exceeds ymax, ymax is updated by the Y-address offset value at that time (step S1807).

It is checked in step S1808 if the offset arithmetic operations for one line are complete by comparing the variable x at that time with an end coordinate xend of one line. If NO in step S1808, the variable x is incremented by "1" in step S1809, and the processes in step S1804 and subsequent steps are repeated.

If it is determined that the offset arithmetic operations for one line are complete, the flow advances to step S1810 to check if the final Y-axis offset value ymax exceeds "1". If NO in step S1810, since no correction is required, the flow advances to step S1811 to write all zeros in the correction arithmetic table 623.

Fifth Embodiment

When the color conversion unit 405 instructs that print information of interest indicates print processing using a single color, i.e., only one image forming unit, no color shifting occurs. Therefore, in such situation, respective profiles may be ignored, and "0"s may be unconditionally written in the correction arithmetic table.

In order to check whether or not to execute color shifting amount correction, a value used to evaluate the maximum value of ymax is additionally set in each color shifting amount arithmetic unit. If ymax is larger than this evaluation value, color shifting correction is executed even for single-color print processing.

Figure 23:
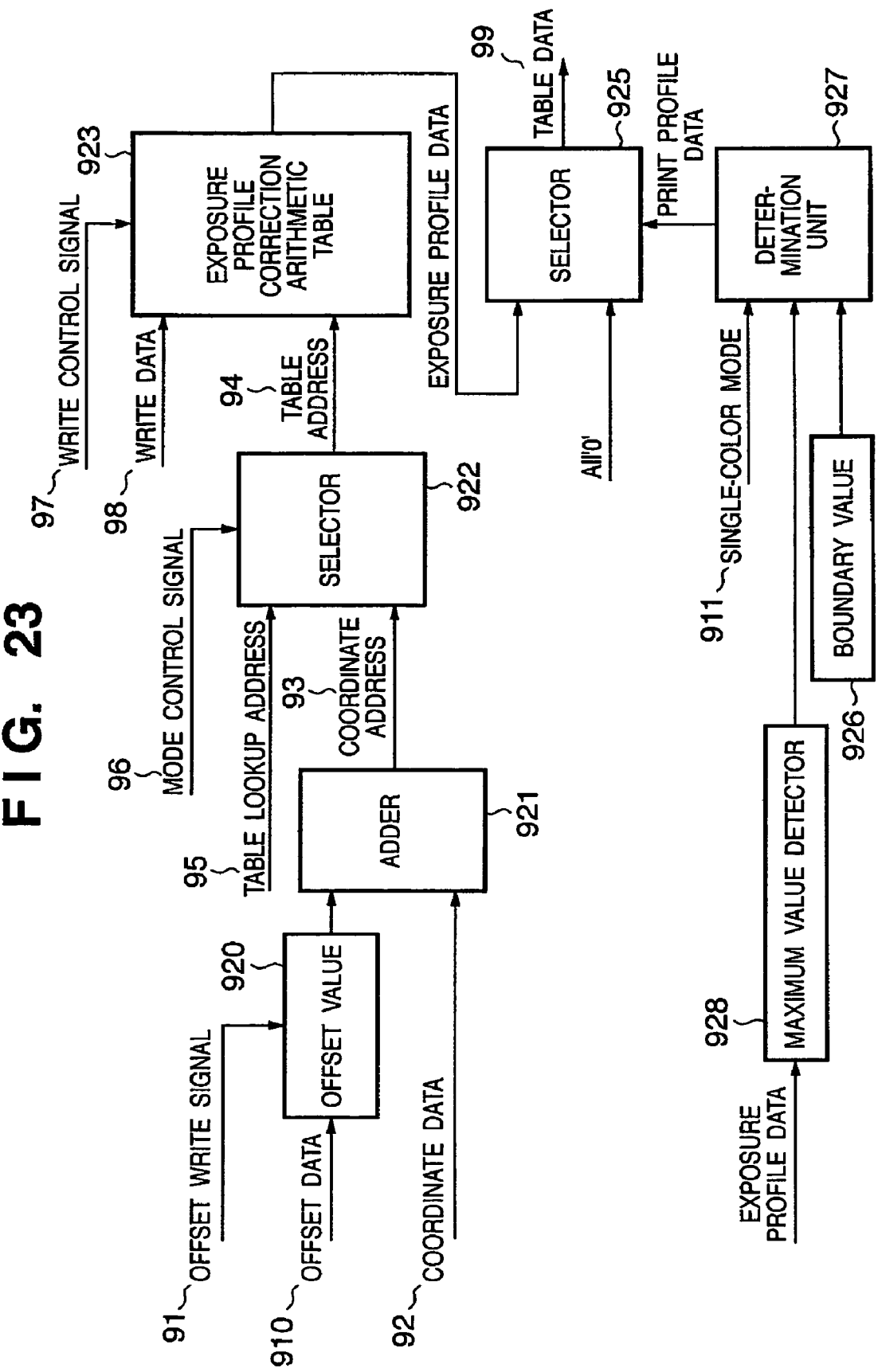
FIG. 23 is a block diagram showing the arrangement of a coordinate counter according to the fifth embodiment of the present invention.

FIG. 23 is a block diagram for implementing such processing in place of FIG. 20.

In FIG. 23, signals 91 to 98 and components 920 to 923 are the same as the signals 61 to 68 and components 620 to 623 in FIG. 20. A difference from FIG. 20 is that a maximum value detector 928 for detecting ymax, a register 926 for storing a boundary value used to determine whether or not to execute color shifting correction, a determination unit 927, and a selector 925 are arranged.

That is, when a single color mode is selected, and data from the maximum value detector 928 is equal to or smaller than data in the register 926, the determination unit 927 controls the selector 925 to unconditionally output "0" so as to inhibit color shifting correction. Under other conditions, the determination unit 927 controls the selector 925 to select data from the correction arithmetic table 923.

Sixth Embodiment

In the description of the third embodiment, exposure profile information is written in each of the exposure profile storage units 1403C, 1403M, 1403Y, and 1403K in the factory manufacturing process. However, such information may be varied from that upon factory shipment due to aging since the apparatus includes many mechanical operation components and the like.

Hence, the sixth embodiment will exemplify a case wherein the controller 402 side writes and updates each exposure profile storage unit 1403. To rewrite the contents, the apparatus comprises a circuit for writing information in the exposure profile storage unit 1403. However, since such circuit is known to those who are skilled in the art, a description thereof will be omitted. In order to update the exposure profile, detection of a color shifting amount of the exposure unit will be explained.

Figure 24:
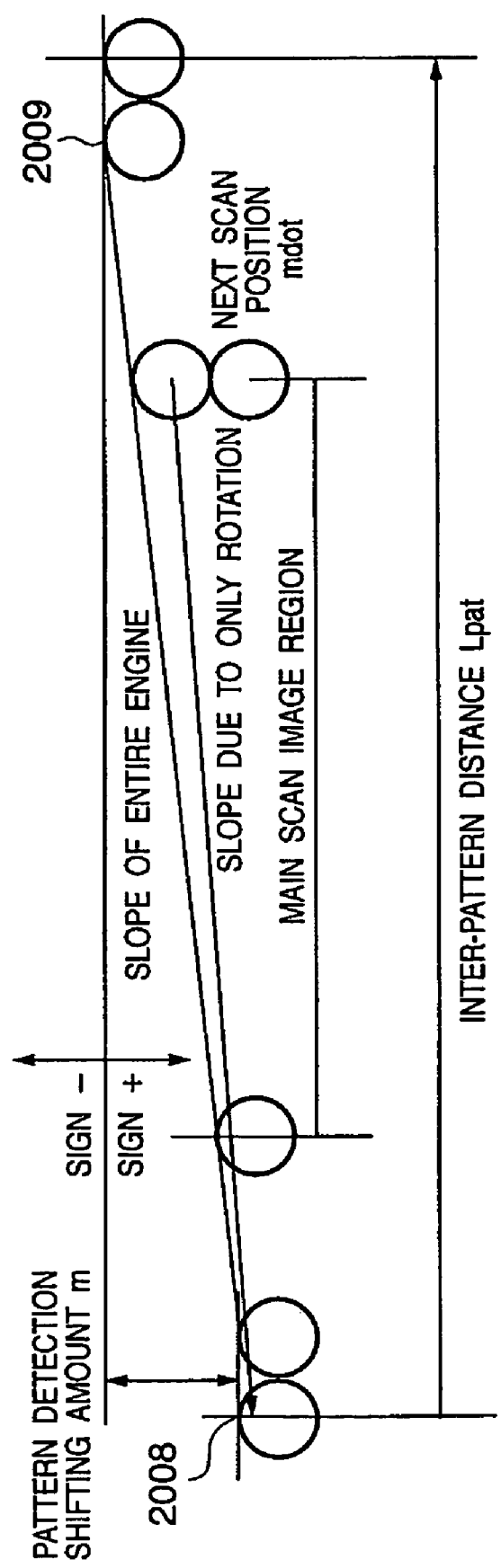
FIG. 24 is a view showing an example of a pattern to be printed in exposure profile update processing according to the sixth embodiment of the present invention.

In the sixth embodiment, as shown in FIG. 24, a 1-line dot pattern is exposed on a pre-exposure region (which is not used in normal print processing and has a length (the number of dots) Lpat) of the photosensitive drum, and is transferred onto a print sheet. After that, the coordinate positions of the right and left ends are detected. At this time, if the photosensitive drum is normal, the detection timings of patterns 2009 and 2008 at the right and left ends of the 1-dot line differ just by the length according to the print profile. That is, in case of the normal photosensitive drum, these patterns are detected at timings having a difference k*m/Lpat.

Therefore, a result obtained by subtracting "k*m/Lpat" is the shifting amount between the right and left ends of the exposure profile at that time. In this embodiment, since shifting amounts at the positions of four points including the two ends are calculated, as shown in FIG. 3, two central points are re-set (overwritten) since they are different from shifting amounts upon factory shipment at the same ratio as that for the two end points.

As a result, since the exposure profile is updated, generation of color shifting can be suppressed in correspondence with aging. Note that the exposure profile is updated when an instruction is input from a control panel (not shown).

Seventh Embodiment

Figure 25:
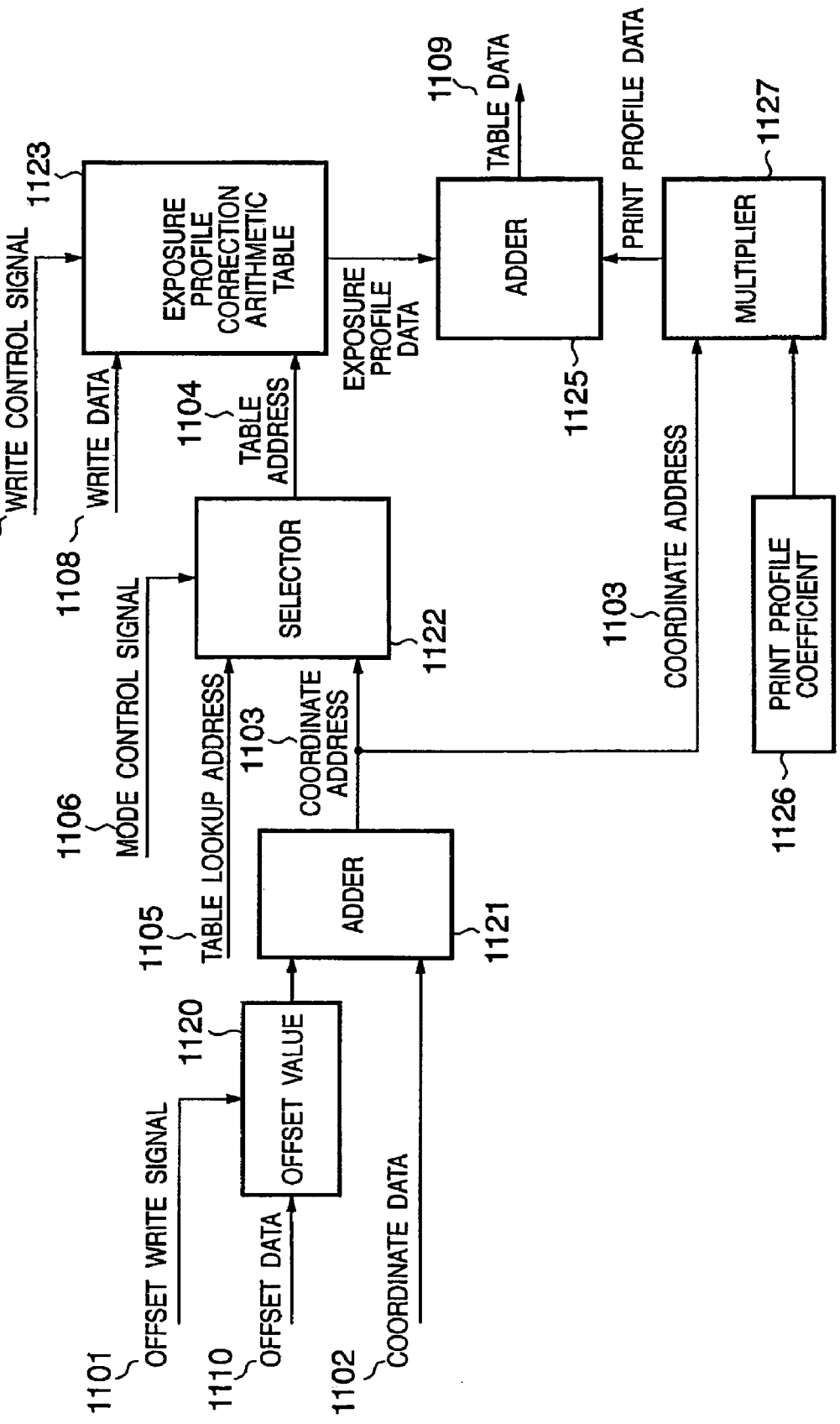
FIG. 25 is a block diagram showing the arrangement of a coordinate counter according to the seventh embodiment of the present invention.

FIG. 25 is a block diagram of the seventh embodiment in place of FIG. 20 described above.

In this arrangement, since print profile data is handled as fixed coefficients, processing is done using that information which changes depending on print processing. With this arrangement, when the exposure profiles are set once upon starting up the apparatus, and the print profile value is changed depending on the internal state, the objective processing can be achieved. Note that reference numerals 1101 to 1108 in FIG. 25 denote signals which are the same as the signals 61 to 68 in FIG. 20, and reference numerals 1120 to 1123 denote building components which are the same as the components 620 to 623 in FIG. 20. A difference is that an adder 1125, multiplier 1127, and register 1126 for holding print profile coefficients are added to FIG. 20.

Figure 26:
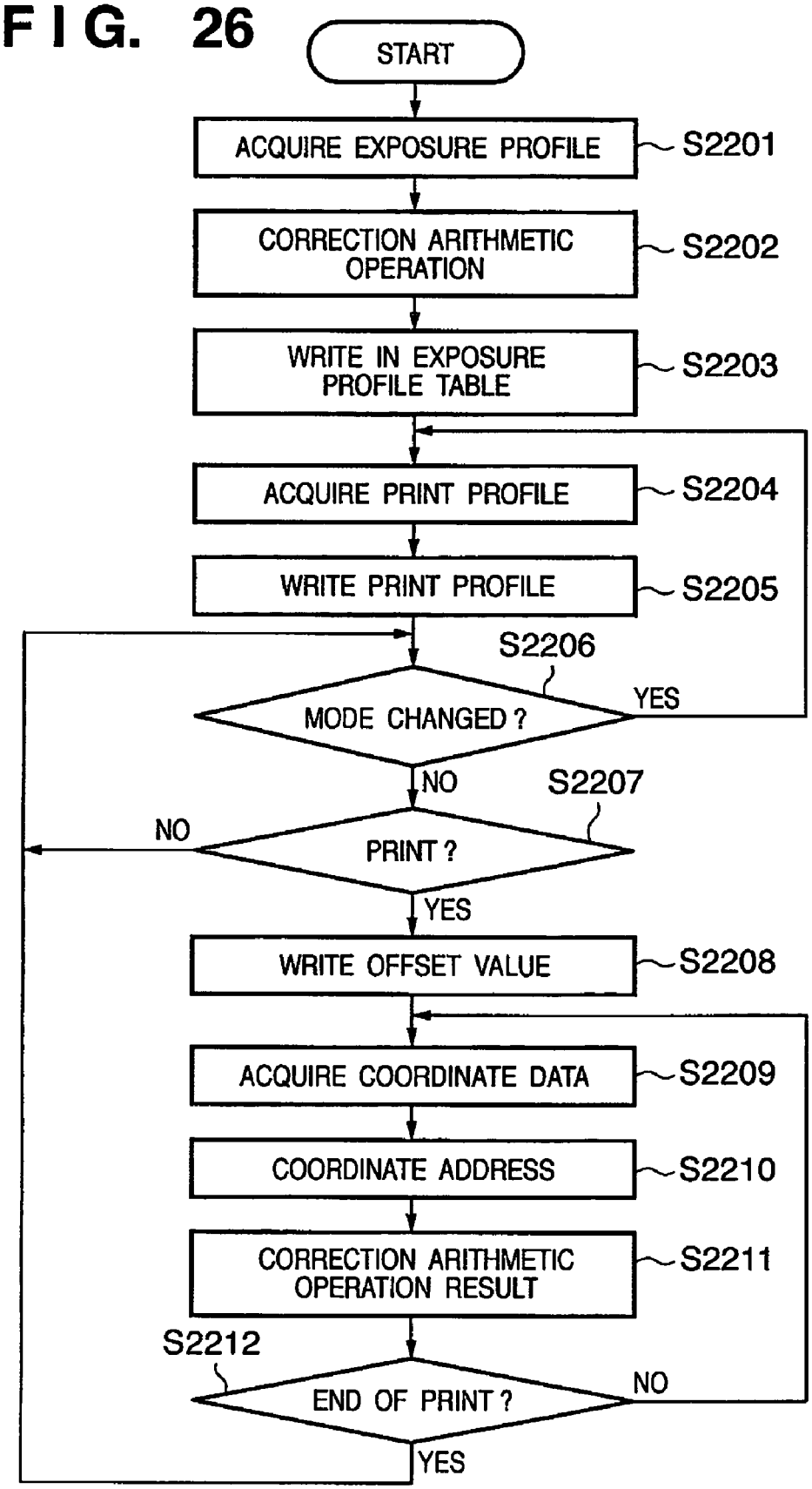
FIG. 26 is a flowchart showing the print processing sequence in the seventh embodiment.

FIG. 26 shows the processing flow in this example. In this case, processing for only the C component will be explained, but the same applies to other components.

In step S2201, an exposure profile is loaded from the exposure profile storage unit 1403C. A color shifting correction amount is calculated based on the exposure profile in step S2202, and the arithmetic result is written in the exposure profile correction arithmetic table 1123 for temporary storage in step S2203.

After that, the flow advances to step S2204 to acquire a print profile from the print profile storage unit 1420 to generate a print profile in consideration of the print mode (the size and conveying direction of print sheets, print speed, and the like). In step S2205, the generated print profile is stored in the register 1126 as a temporary print profile coefficient.

It is checked in step S2206 if the print mode is changed. If it is determined that the print mode is changed, the processes in steps S2204 and S2205 are repeated. That is, the contents to be updated are those of only the register 1126.

If it is detected in step S2207 that print processing starts, the flow advances to step S2208 to load the offset value from the table 1123. In step S2209, coordinate data are determined. In step S2210, data at the corresponding coordinate position is read out from the bitmap memory 406C. In step S2211, correction processing (interpolation processing, exception processing) is executed. Then, the processes in step S2209 and subsequent steps are repeated until it is determined in step S2212 that the print processing is complete.

The preferred embodiments according to the present invention have been explained. The arrangement shown in FIG. 16 may be implemented by software (firmware). In this case, processing that allows image data to flow according to FIG. 16 can be implemented, and such implementation is easy for those who are skilled in the art from the description of this embodiment.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priorities from Japanese Patent Applications No. 2004-350302 filed on Dec. 2, 2004, No. 2004-350303 filed on Dec. 2, 2004 and No. 2004-350304 filed on Dec. 2, 2004, which are hereby incorporated by reference herein.

CANON_APPS 614603_1

What is claimed is:

1. An image forming apparatus in which image forming units each having an image carrier, an exposure unit for scanning exposure on the image carrier, and a developing unit for visualizing an electrostatic latent image generated by exposure using a color former are juxtaposed in a conveying direction of a print medium, comprising:

image data storage means for storing image data to be formed by each image forming unit;

exposure shifting amount storage means for storing shifting amount information indicating a shifting amount with respect to a scanning direction on the image carrier of each image forming unit;

coordinate conversion means for converting coordinates of a read address of said image data storage means on the basis of the exposure shifting amount information stored in said exposure shifting amount storage means, and reading out image data according to the converted address information;

correction means for correcting a tone of pixel data read out by said coordinate conversion means on the basis of the converted address information;

halftone means for applying predetermined halftone processing to the pixel data obtained by said correction means; and output means for outputting the pixel data obtained by said halftone means as an exposure control signal of the exposure unit of the corresponding image forming unit.

2. The apparatus according to claim 1, wherein said exposure shifting amount storage means stores information associated with a plurality of positions in a main scan direction which is an ideal scanning exposure direction of the image carrier, and information associated with distances between an ideal scan exposure line and actual scan exposure line at the respective positions.

3. The apparatus according to claim 2, wherein said coordinate conversion means comprises:

calculation means for calculating slope information of exposure shifts in respective regions indicated by the position information on the basis of the position information and the distance information stored in said exposure shifting amount storage means;

X-address generation means for generating an X-address of the main scan direction as the exposure direction for said image data storage means;

determination means for, every time said X-address generation means updates the X-address, determining to which region calculated by said calculation means the X-address belongs;

selection means for selecting the corresponding slope information on the basis of the determination result of said determination means;

addition means for cumulatively adding the slope information selected by said selection means; and Y-address generation means for generating a Y-address having an integer part of the result added by said addition means as an offset value thereof, and said correction means generates pixel data after tone correction on the basis of a value after a decimal point which is cumulatively added by said addition means, and two pixel data which neighbor in a sub-scan direction.

4. A method of controlling an image forming apparatus in which image forming units each having an image carrier, an exposure unit for scanning exposure on the image carrier, and a developing unit for visualizing an electrostatic latent image generated by exposure using a color former are juxtaposed in a conveying direction of a print medium, comprising:

a step of storing image data to be formed by each image forming unit in predetermined image data storage means;

a read step of reading out, from predetermined exposure shifting amount storage means which stores shifting amount information indicating a shifting amount with respect to a scanning direction on the image carrier of each image forming unit, the exposure shifting amount information;

a coordinate conversion step of converting coordinates of a read address of the image data storage means on the basis of the readout exposure shifting amount information, and reading out image data according to the converted address information;

a correction step of correcting a tone of pixel data read out in the coordinate conversion step on the basis of the converted address information;

a halftone step of applying predetermined halftone processing to the pixel data obtained in the correction step; and an output step of outputting the pixel data obtained in the halftone step as an exposure control signal of the exposure unit of the corresponding image forming unit.

5. The method according to claim 4, wherein the exposure shifting amount storage means stores information associated with a plurality of positions in a main scan direction which is an ideal scanning exposure direction of the image carrier, and information associated with distances between an ideal scan exposure line and actual scan exposure line at the respective positions.

6. The method according to claim 5, wherein the coordinate conversion step comprises:

a calculation step of calculating slope information of exposure shifts in respective regions indicated by the position information on the basis of the position information and the distance information stored in the exposure shifting amount storage means;

an X-address generation step of generating an X-address of the main scan direction as the exposure direction for the image data storage means;

a determination step of determining, every time the X-address is updated in the X-address generation step, to which region calculated in the calculation step the X-address belongs;

a selection step of selecting the corresponding slope information on the basis of the determination result in the determination step;

an addition step of cumulatively adding the slope information selected in the selection step; and a Y-address generation step of generating a Y-address having an integer part of the result added in the addition step as an offset value thereof, and the correction step includes a step of generating pixel data after tone correction on the basis of a value after a decimal point which is cumulatively added in the addition step, and two pixel data which neighbor in a sub-scan direction.

7. An image forming apparatus in which image forming units each having an image carrier, an exposure unit for scanning exposure on the image carrier, and a developing unit for visualizing an electrostatic latent image generated by exposure using a color former are juxtaposed in a conveying direction of a print medium, comprising:

image data storage means for storing image data to be formed by each image forming unit;

exposure shifting amount storage means for storing shifting amount information indicating a shifting amount with respect to a scanning direction on the image carrier of each image forming unit;

coordinate conversion means for converting coordinates of a read address of said image data storage means on the basis of the exposure shifting amount information stored in said exposure shifting amount storage means, and reading out image data according to the converted address information;

buffer means for storing pixel data read out by said coordinate conversion means for a plurality of lines;

determination means for determining, based on pixel data of interest and a surrounding pixel data group stored in said buffer means, if the pixel data of interest belongs to an image edge;

first processing means for, when said determination means determines that the pixel of interest belongs to a non-image edge, applying halftone processing for the non-image edge to the pixel data of interest;

correction means for, when said determination means determines that the pixel of interest belongs to the image edge, correcting a tone of the pixel data of interest stored in said buffer means on the basis of address information used upon conversion by said coordinate conversion means;

second processing means for applying processing for an edge different from said first processing means to the pixel data obtained by said correction means; and output means for outputting the pixel data obtained by said first and second processing means as an exposure control signal of the exposure unit of the corresponding image forming unit on the basis of the determination result of said determination means.

8. The apparatus according to claim 7, wherein said exposure shifting amount storage means stores information associated with a plurality of positions in a main scan direction which is an ideal scanning exposure direction of the image carrier, and information associated with distances between an ideal scan exposure line and actual scan exposure line at the respective positions.

9. The apparatus according to claim 8, wherein said coordinate conversion means comprises:

calculation means for calculating slope information of exposure shifts in respective regions indicated by the position information on the basis of the position information and the distance information stored in said exposure shifting amount storage means;

X-address generation means for generating an X-address of the main scan direction as the exposure direction for said image data storage means;

determination means for, every time said X-address generation means updates the X-address, determining to which region calculated by said calculation means the X-address belongs;

selection means for selecting the corresponding slope information on the basis of the determination result of said determination means;

addition means for cumulatively adding the slope information selected by said selection means; and Y-address generation means for generating a Y-address having an integer part of the result added by said addition means as an offset value thereof, and said correction means generates pixel data after tone correction on the basis of a value after a decimal point which is cumulatively added by said addition means, and two pixel data which neighbor in a sub-scan direction.

10. A method of controlling an image forming apparatus in which image forming units each having an image carrier, an exposure unit for scanning exposure on the image carrier, and a developing unit for visualizing an electrostatic latent image generated by exposure using a color former are juxtaposed in a conveying direction of a print medium, comprising:

a step of storing image data to be formed by each image forming unit in predetermined image data storage means;

a read step of reading out, from predetermined exposure shifting amount storage means which stores shifting amount information indicating a shifting amount with respect to a scanning direction on the image carrier of each image forming unit, the exposure shifting amount information;

a coordinate conversion step of converting coordinates of a read address of the image data storage means on the basis of the readout exposure shifting amount information, and reading out image data according to the converted address information;

a step of storing, in buffer means, pixel data read out in the coordinate conversion step for a plurality of lines;

a determination step of determining, based on pixel data of interest and a surrounding pixel data group stored in the buffer means, if the pixel data of interest belongs to an image edge;

a first processing step of applying, when it is determined in the determination step that the pixel of interest belongs to a non-image edge, applying halftone processing for the non-image edge to the pixel data of interest;

a correction step of correcting, when it is determined in the determination step that the pixel of interest belongs to the image edge, a tone of the pixel data of interest stored in the buffer means on the basis of address information used upon conversion in the coordinate conversion step;

a. second processing step of applying processing for an edge different from the first processing step to the pixel data obtained in the correction step; and an output step of outputting the pixel data obtained in the first and second processing steps as an exposure control signal of the exposure unit of the corresponding image forming unit on the basis of the determination result of the determination step.

11. The method according to claim 10, wherein the exposure shifting amount storage means stores information associated with a plurality of positions in a main scan direction which is an ideal scanning exposure direction of the image carrier, and information associated with distances between an ideal scan exposure line and actual scan exposure line at the respective positions.

12. The method according to claim 11, wherein the coordinate conversion step comprises:

a calculation step of calculating slope information of exposure shifts in respective regions indicated by the position information on the basis of the position information and the distance information stored in the exposure shifting amount storage means;
an X-address generation step of generating an X-address of the main scan direction as the exposure direction for the image data storage means;
a determination step of determining, every time the X-address is updated in the X-address generation step, to which region calculated in the calculation step the X-address belongs;
a selection step of selecting the corresponding slope information on the basis of the determination result in the determination step;
an addition step of cumulatively adding the slope information selected in the selection step; and
a Y-address generation step of generating a Y-address having an integer part of the result added in the addition step as an offset value thereof, and
the correction step includes a step of generating pixel data after tone correction on the basis of a value after a decimal point which is cumulatively added in the addition step, and two pixel data which neighbor in a sub-scan direction.

13. An image forming apparatus in which image forming units each having an image carrier, an exposure unit for scanning exposure on the image carrier, and a developing unit for visualizing an electrostatic latent image generated by exposure using a color former are juxtaposed in a conveying direction of a print medium, comprising:
    image data storage means for storing image data to be formed by each image forming unit;
    exposure shifting amount storage means for storing shifting amount information indicating a shifting amount with respect to a scanning direction on the image carrier of each image forming unit;
    configuration information storage means for storing information associated with a configuration of each image forming unit;
    coordinate conversion means for converting coordinates of a read address of said image data storage means on the basis of the exposure shifting amount information stored in said exposure shifting amount storage means and the configuration information stored in said configuration information storage means, and reading out image data according to the converted address information;
    determination means for determining, based on pixel data of interest and a surrounding pixel data group obtained by said coordinate conversion means, if the pixel data of interest belongs to an image edge;
    first processing means for, when said determination means determines that the pixel of interest belongs to a non-image edge, applying predetermined halftone processing;
    correction means for, when said determination means determines that the pixel of interest belongs to the image edge, correcting a tone of the pixel data of interest on the basis of the converted address information;
    second processing means for applying processing for an edge different from said first processing means to the pixel data of interest after correction by said correction means; and
    output means for outputting one of the pixel data obtained by said first and second processing means as an exposure control signal of the exposure unit of the corresponding image forming unit on the basis of the determination result of said determination means.

14. The apparatus according to claim 13, wherein said exposure shifting amount storage means stores information associated with a plurality of positions in a main scan direction which is an ideal scanning exposure direction of the image carrier, and information associated with distances between an ideal scan exposure line and actual scan exposure line at the respective positions.

15. The apparatus according to claim 14, wherein said coordinate conversion means comprises:
    calculation means for calculating information associated with positions where an exposure direction changes on the basis of the position information stored in said exposure shifting amount storage means to calculate coordinates of regions defined between the neighboring positions where the exposure direction changes, and calculating a composite slope of scanning with respect to a main scan exposure direction for each region on the basis of the information stored in said configuration information storage means and said exposure shifting amount storage means;
    X-address generation means for generating an X-address of the main scan direction as the exposure direction for said image data storage means;
    determination means for, every time said X-address generation means updates the X-address, determining to which region calculated by said calculation means the X-address belongs;
    selection means for selecting the corresponding slope information on the basis of the determination result of said determination means;
    addition means for cumulatively adding the slope information selected by said selection means; and
    Y-address generation means for generating a Y-address having an integer part of the result added by said addition means as an offset value thereof, and
    said correction means generates pixel data after tone correction from two pixel data which neighbor in a sub-scan direction on the basis of a value after a decimal point which is cumulatively added by said addition means.

16. The apparatus according to claim 14, wherein said coordinate conversion means comprises:
    calculation means for calculating coordinates of a plurality of exposure regions on the basis of the position information stored in said exposure shifting amount storage means and information associated with a plurality of positions where an exposure direction changes, calculating a composite slope of scanning with respect to a main scan direction for each region on the basis of the information stored in said configuration information storage means and said exposure shifting amount storage means, and calculating offset addresses in a sub-scan direction at respective x-coordinate positions in the main scan direction and weighting coefficients at the respective x-coordinate positions;
    table generation means for generating a lookup table on the basis of the calculation results of said calculation means; and
    read means for generating a Y-address based on an X-address generated with reference to the table generated by said table generation means, and the offset address, and reading pixel data, and
    said correction means generates pixel data after tone correction by weighting and interpolating two pixel data which neighbor in the sub-scan direction using the weighting coefficients stored together with the offset address which is referred to upon reading the pixel data by said read means.

17. The apparatus according to claim 13, further comprising update means for updating said exposure shifting amount storage means by forming a predetermined pattern by each image forming unit, and detecting the pattern.

18. A method of controlling an image forming apparatus in which image forming units each having an image carrier, an exposure unit for scanning exposure on the image carrier, and a developing unit for visualizing an electrostatic latent image generated by exposure using a color former are juxtaposed in a conveying direction of a print medium, comprising:
   a step of storing image data to be formed by each image forming unit in predetermined image data storage means;
   a step of reading, from exposure shifting amount storage means which stores shifting amount information indicating a shifting amount with respect to a scanning direction on the image carrier of each image forming unit, the shifting amount information;
   a step of reading, from configuration information storage means which stores information associated with a configuration of each image forming unit, the configuration information;
   a coordinate conversion step of converting coordinates of a read address of the image data storage means on the basis of the read exposure shifting amount information and the configuration information, and reading out image data according to the converted address information;
   a determination step of determining, based on pixel data of interest and a surrounding pixel data group obtained in the coordinate conversion step, if the pixel data of interest belongs to an image edge;
   a first processing step of applying, when it is determined in the determination step that the pixel of interest belongs to a non-image edge, predetermined halftone processing;
   a correction step of correcting, when it is determined in the determination step that the pixel of interest belongs to the image edge, a tone of the pixel data of interest on the basis of the converted address information;
   a second processing step of applying processing for an edge different from the first processing step to the pixel data of interest after correction in the correction step; and
   an output step of outputting one of the pixel data obtained in the first and second processing steps as an exposure control signal of the exposure unit of the corresponding image forming unit on the basis of the determination result of the determination step.

19. The method according to claim 18, wherein the exposure shifting amount storage means stores information associated with a plurality of positions in a main scan direction which is an ideal scanning exposure direction of the image carrier, and information associated with distances between an ideal scan exposure line and actual scan exposure line at the respective positions.

20. The method according to claim 19, wherein the coordinate conversion step comprises:
   a calculation step of calculating information associated with positions where an exposure direction changes on the basis of the position information stored in said exposure shifting amount storage means to calculate coordinates of regions defined between the neighboring positions where the exposure direction changes, and calculating a composite slope of scanning with respect to a main scan direction for each region on the basis of the information stored in the configuration information storage means and the exposure shifting amount storage means;
   an X-address generation step of generating an X-address of the main scan direction as the exposure direction for the image data storage means;
   a determination step of determining, every time the X-address is updated in the X-address generation step, to which region calculated in the calculation step the X-address belongs;
   a selection step of selecting the corresponding slope information on the basis of the determination result of the determination step;
   an addition step of cumulatively adding the slope information selected in the selection step; and
   a Y-address generation step of generating a Y-address having an integer part of the result added in the addition step as an offset value thereof, and
   the correction step includes a step of generating pixel data after tone correction from two pixel data which neighbor in a sub-scan direction on the basis of a value after a decimal point which is cumulatively added in the addition step.

21. The method according to claim 19, wherein the coordinate conversion step comprises:
   a calculation step of calculating coordinates of a plurality of exposure regions on the basis of the position information stored in the exposure shifting amount storage means and information associated with a plurality of positions where an exposure direction changes, calculating a composite slope of scanning with respect to a main scan direction for each region on the basis of the information stored in the configuration information storage means and the exposure shifting amount storage means, and calculating offset addresses in a sub-scan direction at respective x-coordinate positions in the main scan direction and weighting coefficients at the respective x-coordinate positions;
   a table generation step of generating a lookup table on the basis of the calculation results in the calculation step; and
   a read step of generating a Y-address based on an X-address generated with reference to the table generated in the table generation step, and the offset address, and reading pixel data, and
   the correction step includes a step of generating pixel data after tone correction by weighting and interpolating two pixel data which neighbor in the sub-scan direction using the weighting coefficients stored together with the offset address which is referred to upon reading the pixel data in the read step.

* * * * *